United States Patent
Toda

(10) Patent No.: US 6,404,448 B1
(45) Date of Patent: Jun. 11, 2002

(54) COLOR-IMAGE FORMING APPARATUS WITH WRITE START POSITION SETTER

(75) Inventor: Tsuneo Toda, Urawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/722,326

(22) Filed: Nov. 28, 2000

(30) Foreign Application Priority Data

Mar. 13, 2000 (JP) ........................................ 2000-069389

(51) Int. Cl.⁷ .......................... G02B 26/10; G03G 15/01
(52) U.S. Cl. ........................................ 346/116; 347/234
(58) Field of Search ................................. 347/116, 232, 347/234, 235, 248; 359/204

(56) References Cited

U.S. PATENT DOCUMENTS 5,982,402 A * 11/1999 Yoshikawa et al. ......... 347/116

FOREIGN PATENT DOCUMENTS

| JP | 63-065457 | 3/1988 |
| JP | 2-105169 | 4/1990 |
| JP | 3-142412 | 6/1991 |

* cited by examiner

*Primary Examiner*—Joan Pendegrass
(74) *Attorney, Agent, or Firm*—Morgan, Lewis & Bockius LLP

(57) ABSTRACT

A sub-scanning position of a laser beam is detected as an analog signal by a sub-scanning position detection sensor, and is then converted into a digital signal by an A/D converter. The signal is converted into a digital value (a detection result) having the same unit system as that of a count value for generating a vertical synchronization signal. This detection result and a set count value which is a count value for generating a vertical synchronization signal are added together by an adder. This added value is input to a vertical synchronization signal generation counter as a count value for generating an actual vertical synchronization signal. The set count value which is an initial set value is set from a control panel. Accordingly, a color-image forming apparatus which is capable of correcting a registration deviation in a sub-scanning direction is easily provided.

11 Claims, 16 Drawing Sheets

FIG. 5
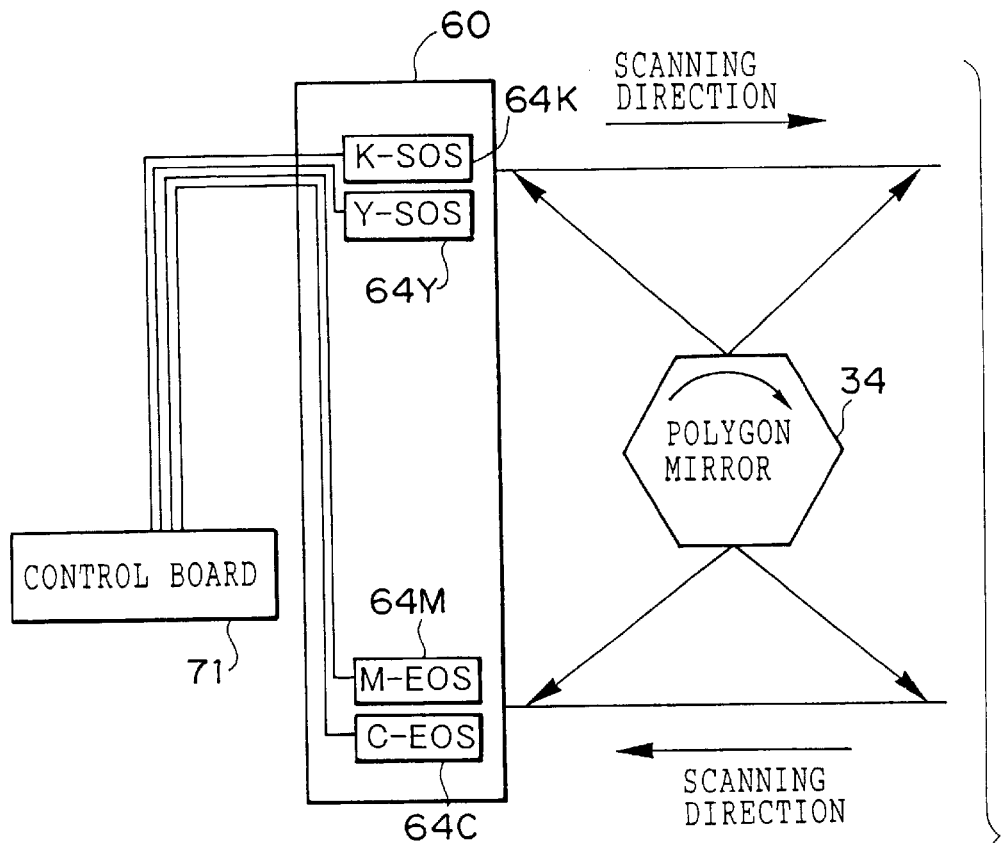
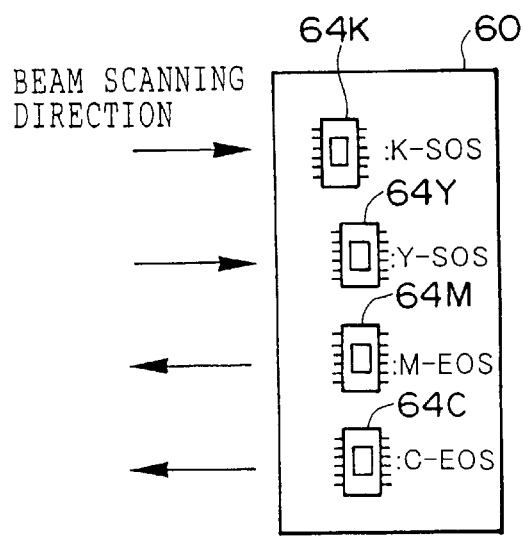

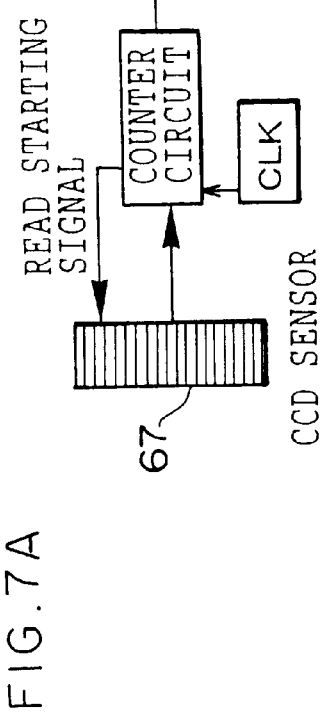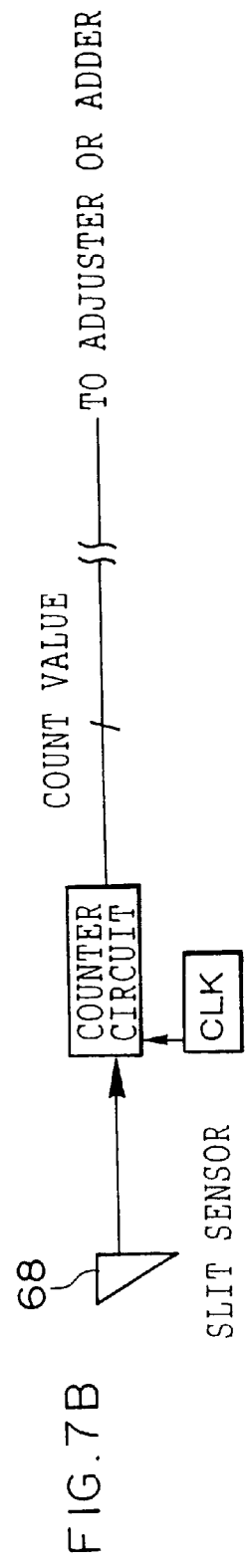
FIG.7A
FIG.7B

COLOR-IMAGE FORMING APPARATUS WITH WRITE START POSITION SETTER

BACKGROUND OF THE INVENTION

1. Field of the Invention

The present invention relates to a color-image forming apparatus, and relates, more particularly, to a color-image forming apparatus of an electronic photographing system such as a laser printer and a laser-copying machine.

2. Description of the Related Art

Along with the progress of digitalization and coloring of images in recent years, there has been an increasing trend to utilize a color-image forming apparatus, like a laser printer and a laser-copying machine, which expose a photosensitive member by scanning it with laser beams. Particularly, in the case of forming a color image, the four colors black, yellow, magenta and cyan are superimposed. Therefore, this type of color-image forming apparatus has lower productivity than that of the conventional black and white image forming apparatus. In order to solve this problem, a tandem color-image forming apparatus that simultaneously forms four color images has been devised.

The tandem color-image forming apparatus has a plurality of photosensitive members. This color-image forming apparatus exposes each photosensitive member with each laser beam that has been modulated according to image data which has divided image into each of the color component. The color-image forming apparatus then develops these photosensitive members, and superimposes the developed color images on the same transfer medium, to thereby form a color-combined colored image. Therefore, the tandem color-image forming apparatus has a substantially improved productivity.

However, on the other hand, unless image positions of the colors are matched correctly, there occurs a shift in the position of the colors due to variations in the optical characteristics of the laser beams emitted from an exposure apparatus. Thus, it becomes impossible to maintain the quality of a printed image. There are five items that are necessary for the positioning. They are a write start position of a scanning line in a main scanning direction (hereinafter to be referred to as side registration), a write start position of a scanning line in a sub-scanning direction (hereinafter to be referred to as lead registration), a write ending position of the scanning line in the main-scanning direction, or a print width (hereinafter to be referred to as a scale factor), a curve of the scanning line itself (hereinafter to be referred to as a scanning line curve), and an inclination of the scanning line (hereinafter to be referred to as a scanning line inclination). A high-quality image can be formed only when conditions relating to these five items are satisfied.

Further, according to the tandem color-image forming apparatus, the type of the exposure apparatus is broadly classified into two types. FIG. 16 shows an apparatus having four scan exposure devices 300 arranged therein, each device having one laser beam (hereinafter to be referred to as a four-series tandem system). The four-tandem system has four scan rotation motors 302 for the four exposure devices respectively. Therefore, a feature of this system is that independent laser beam scanning positions exist.

An apparatus for scanning four light beams with one motor is disposed in Japanese Patent Application Laid-Open Publication (JP-A) No. 3-142412 (This system will hereinafter be referred to as a spray paint system). As the spray paint system has one scan rotation motor as a deflector, this system is characterized by the laser beam positions being related to each other.

First, the four-series tandem color-image forming apparatus will be described in detail. As shown in FIG. 16, the color-image forming apparatus of the four-series tandem system has four separate scan exposure devices 301. These scan exposure devices 300 expose color images of K (black), Y (yellow), M (magenta), and C (cyan) respectively. Each scan exposure device 300 carries out an image exposure for each color on a photosensitive member 304 provided for each color, to thereby form an electrostatic latent image. After completing the exposure, each electrostatic latent image on each photosensitive member 304 is developed by each developer 306. Each developed image is transferred onto a transfer belt 308 as a single transfer member. At the time of this image transfer, the respective colors are sequentially superimposed to form a color image. This system combines the colors (that is, the positioning of scan beams) by taking the above-mentioned five items into consideration. According to this color-image forming apparatus of the four-series tandem system, it is necessary to provide a special mechanism for controlling the phases of the rotation of the four motors, as these motors operate independently of each other.

On the other hand, according to the color-image forming apparatus of the spray paint system, generally, the scan exposure device itself is relatively compact, as the laser beams corresponding to the respective colors are scanned by one motor. A color image is formed in a similar manner to that of the above-described color-image forming apparatus of the four-series tandem system. However, a feature of the spray paint system is that it is not necessary to provide a special control mechanism for the motor, as the scan laser beams of the respective colors are linked with each other and scanned. A difference between these characteristics can be considered as the degree of freedom in positioning in the sub-scanning direction.

In the case of the four-series tandem system, there is a large amount of freedom in the timing of the positioning, as the motors are independent of each other. In other words, it becomes possible to position the colors at substantially the same position. It is possible to achieve this by controlling the rotation phases of the motors. On the other hand, in the case of the spray paint system, the positioning is carried out in the scan line unit, as the laser beams are based on one motor and thus related to each other. It is also possible to control the rotation phases in a unit smaller than the scan line unit based on other techniques. It has been known that according to a high-resolution image forming apparatus developed in recent years, a color deviation is not so noticeable even when the positioning is carried out in a scan line unit. In control based on a scan line unit using two laser beams, a maximum amount of deviation is one half line.

The color matching in the above-described color-image forming apparatuses will be described next. According to the tandem color-image forming apparatus, it is necessary to carry out the positioning by correcting the side registration, the lead registration, the scale factor, the scan line curve, and the scan line inclination. Among these items to be corrected, the correction of the lead registration that is a feature of the present invention will be described. Prior-art techniques will be described, with a detecting system and a control system being described in that order.

According to an apparatus described in JP-A No. 2-105169 as a first prior-art technique, for detecting a color deviation, at first, each photosensitive member is exposed and an image is developed using pattern images for measuring each color at a predetermined timing. Each pattern image of each color formed by this operation is transferred onto a transfer belt. Information on a position of color deviation is obtained by detecting position information of each pattern image with a reading sensor. According to this invention, a reflection-type phototransistor is used as a reading sensor. Therefore, in actual practice, a gap between pattern images of each color is obtained as color deviation information. It is possible to determine a deviation in the position of each color by measuring an output corresponding to the interval of the gap between the colors. Based on a result of the color deviation obtained in this way, the lead registration which is the write start position in the sub-scanning direction is corrected. There is also a similar method using a CCD sensor as a reading sensor.

In an apparatus described in JP-A No. 63-65457 which is a second prior-art technique, a reading sensor is disposed near a photosensitive member. Instead of detecting a pattern image as described above, an irradiation position of a laser beam itself is detected by a sensor like a PSD. By obtaining information about a magnitude of a deviation of this irradiation position from a correct irradiation position which should be scanned to avoid color deviation, the lead registration which is the write start position in the sub-scanning direction is corrected.

The control system will be described next. According to the tandem color-image forming apparatus, the precision of control in the sub-scanning direction is different depending on the type of the exposure device. In other words, as described above, in the case of the color-image forming apparatus of the four-series tandem system, independent scan rotation motors exist.

Therefore, the amount of freedom of control in the sub-scanning direction is high because the adjustment of the rotation phases is added. However, in principle, both types of exposure devices change the write start position in the sub-scanning direction by advancing or delaying the write starting time in the sub-scanning direction with respect to a predetermined reference time. Therefore, it can be said that the adjustment of the rotation phases in the four-series tandem system is a simple additional control for carrying out a higher-precision control. The principal control method can be used not only in the tandem color-image forming apparatus but also in the general black and white image forming apparatus. According to this control system, a control method in the scan line unit is used. Therefore, it is possible to provide a relatively simple structure based on a discrete lead registration control although it is not possible to increase the control precision. In the case of the four-series tandem system that has the rotation phase adjustment of the scan rotation motor added to the principal control method, it becomes possible to carry out a control in the scan line unit or in a smaller unit. However, the structure becomes complex in this case.

In the case of the tandem color-image forming apparatus, it is not possible to obtain a high-definition color image unless a color deviation is corrected based on one method and another. First, it is necessary to detect a deviation in color images. According to the above-described first prior-art technique, as a detection method, measurement pattern images for matching colors are formed on a transfer medium that is a medium for superimposing images. Then, these pattern images are read by the reading sensor, to thereby obtain a positional relationship between the colors, that is, a positional relationship between respective scanning laser beams. In this case, the high-definition color image means that the image has no color deviation. Further, the precision of the positioning (resolution) based on the color scanning laser beams is determined by the resolution of the reading sensor.

In the 600 DPI (Dots Per Inch) which has become a general write density in recent years, the resolution of at least a few dozens μm or below is required for matching colors. It is very difficult to read a reflection beam of a toner image of four color patterns at this level of precision. In consideration of the need for a correction at a higher precision level based on a higher resolution, it is difficult to meet this requirement. In order to meet this requirement, it is essential to use an analog processing circuit to increase the precision in addition to increasing the sensitivity in each color area of the detection sensor. This results in an extremely expensive detection system. When a CCD sensor is used in the detector, it is clear that the system becomes more expensive. Therefore, as there are advances such that picture quality have higher resolution, it becomes more difficult to meet the requirements of the high precision detection system.

As a separate measure for improving the precision in the reading, special characteristics may be imparted to marks in the test image. In this case, it is necessary to carry out number of kinds of processing. This requires a heavy load on the processing system. In addition to the time required for the adjustment processing, more processing time is required. Further, when the processing system has high performance, the cost increases correspondingly.

As a method for detecting a position with high precision, there is a method of directly detecting a laser beam having directivity by a detector like a PSD based on the second prior-art technique. Particularly, in the case of detecting a focused laser beam, it is possible to obtain precision at a certain level. However, according to the second prior-art technique, there occurs a problem in the manufacturing and assembling of the color-image forming apparatus that includes an exposure apparatus. In other words, according to the prior-art technique, it has been necessary to determine in advance a reference position at which color deviation is not generated as the position that is to be scanned. As a result, in the prior art, it has been necessary to adjust this reference position at the time of manufacturing the exposure apparatus, and has been necessary to implement the adjustment when the exposure apparatus has been built into the color-image forming apparatus. At the time of the manufacturing and assembling, a slight deviation may occur due to error. However, as this deviation directly results in the color deviation in the color image, it is necessary to carry out this adjustment very precisely. Further, as it is necessary to compare the position information of the position to be scanned with the position information of the position currently being scanned, the post-processing system may become complex. Further, when the adjustment is made with high precision, the adjustment of the reference becomes burdensome, and only the comparative detection is not sufficient for the control. Thus, there has been a problem that it is very difficult to meet the strict requirement for higher precision to satisfy the demands that will be made for higher resolution.

Further, according to the second prior-art technique, only the positions which are to be scanned and are independently provided for each color are controlled. Based on this, the deviation of the lead registration necessary for matching colors of the color image is controlled. In principle, it is considered the amount of color deviation as a whole is minimized when color deviation is controlled based on relationship between the colors. However, in the above-described prior-art techniques, color deviation is controlled independently and for this reason, the precision of the correction has not been sufficient.

SUMMARY OF THE INVENTION

The present invention has been made in light of the above-described problems. It is, therefore, an object of the present invention to provide a color-image forming apparatus that can detect a position with high precision without using a special or expensive device in the detection system, that can correct a deviation of the lead registration which is necessary for matching colors of a color image in a relatively simple structure, and that can form a high-definition color image by correcting a color deviation into an optimum value below a scan line unit.

In order to achieve the above-mentioned object, a first aspect of the present invention is a color-image forming apparatus comprising: a plurality of photosensitive members; a light source for emitting a plurality of optical beams; a scanning apparatus for forming images of each color component on the photosensitive members by scanning the plurality of optical beams on the corresponding photosensitive members; a setter capable of arbitrarily and variably setting write start positions in sub-scanning directions of respective colors; a plurality of sub-scanning position detection sensors each for detecting a sub-scanning position of a scan optical beam of each color; and a calculating unit for calculating a write start position in the sub-scanning direction based on a set value of the setter and a detection result of each of the plurality of sub-scanning position detection sensors, wherein the color-image forming apparatus sequentially transfers the plurality of images formed on the plurality of photosensitive members onto a transfer unit such that the images are superimposed on the transfer unit, to thereby obtain a single image on the transfer unit.

According to the above aspect, the color-image forming apparatus has a setter capable of arbitrarily and variably setting write start positions in sub-scanning directions of respective colors, and a plurality of sub-scanning position detection sensors each for detecting a scan laser beam position of each color. A write start timing in a corresponding sub-scanning direction can be obtained by a calculating unit on the basis of set values, which are set arbitrarily and in advance by the setter such that the write start positions of the respective colors coincide, and a detection value obtained by the sub-scanning position detection sensor so that the lead registrations of respective colors have a predetermined relationship. When a scan beam position has changed, this change is reflected by a detection result of each of the plurality of sub-scanning position detection sensors. As a result, it is possible to obtain a write start timing in the corresponding sub-scanning direction by utilizing the detection result. Therefore, according to the above aspect, a desired value of the lead registration of each color is determined based on a set value set by the setter and a current position of the scan laser beam. Thus, it is not necessary to carry out a troublesome adjustment of the lead registration.

A plurality of the scanning apparatus, the setter, the sub-scanning position detection sensor and the calculating unit respectively may be provided for each color.

Further, according to a second aspect of the invention, there is provided a color-image forming apparatus of the above aspect, wherein the calculating unit calculates a write start position in the sub-scanning direction by adding or subtracting the set value of the setter and the detection result of the sub-scanning position detection sensor.

According to the above aspect, the calculating unit that calculates a write start position in the sub-scanning direction by adding or subtracting the set value of the setter and the detection result of the sub-scanning position detection sensor is a simple adder or a subtractor. Therefore, it is possible to simplify the control algorithm or shorten the processing time. Further, it is possible to provide the circuit in a small scale.

Further, according to a third aspect of the invention, there is provided a color-image forming apparatus of the above aspect, wherein the plurality of sub-scanning position detection sensors are provided within the scanning apparatus.

In principle, it is best to detect a scan beam position at a position near the photosensitive member on which an image is actually written by a scanning optical beam. However, the application of the present invention is effective when it is not possible to provide a sub-scanning position detection sensor within the color-image forming apparatus or when a compact color-image forming apparatus is desirable. Further, it is possible to concentrate a plurality of sub-scanning position detection sensors at one place by providing the sub-scanning position detection sensor within the scanning apparatus. Therefore, there is an advantage in that it is possible to form them on one substrate.

Further, according to a fourth aspect of the invention, there is provided a color-image forming apparatus of the above aspect, the color-image forming apparatus further comprising a temperature detection sensor for detecting a temperature within the color-image forming apparatus, wherein the calculating unit calculates a write start position in the sub-scanning direction at least prior to an image formation processing, and after a lapse of a predetermined time or when a temperature detected by the temperature detection sensor has exceeded a predetermined temperature.

The correction of a lead registration is carried out in order to form a high-definition color image. After the lead registration has been set once, a deviation of the lead registration is not so large. According to the above aspect, a write start position in the sub-scanning direction is calculated at least prior to an image formation processing, and thereafter, the write start position is calculated again after a lapse of a predetermined time or when a temperature has exceeded a predetermined temperature. Therefore, it is possible to prevent a further deviation in the lead registration. As a result, it is possible to maintain a high-definition color image.

Further, according to a fifth aspect of the invention, there is provided a color-image forming apparatus of the above aspect, wherein, in image formation, a write start position in the sub-scanning direction is determined during a period other than a period when the image is being formed.

When a lead registration is corrected during an image formation, a formed image may be disturbed by this correction. In other words, when the lead registration is corrected during the image formation, the state of a color is changed, lines are generated or the color becomes uneven. When in image formation, a write start position in the sub-scanning direction is determined during a period other than an image formation period as explained in the above aspect, it is possible to prevent a problem like a disturbance in the image. As explained above, when the lead registration is corrected only during a period other than the image formation period, these problems with the picture quality do not occur. Further, when the sub-scanning position detection sensor is provided at the outside of an image formation section, it is always possible to observe a positional variation in the scanning laser beam. Therefore, in the case of printing for each plurality of images, it is possible to correct the lead registration by utilizing the inter-image. It is also possible to shorten the correction time actually required. When the lead registration is corrected during the image formation, various high-voltage noises and impulse components of the image forming apparatus are generated. On the contrary, this adversely affects the control, and has a risk of disturbing the image. According to the above aspect, it is possible to prevent the correction of the lead registration from adversely affecting the picture quality.

Further, according to a sixth aspect of the invention, there is provided a color-image forming apparatus of the above aspect, wherein the plurality of sub-scanning position detection sensors have higher resolution than the image writing resolution and the color-image forming apparatus further comprises a converter for converting a detection result of each of the plurality of sub-scanning position detection sensors into a predetermined conversion value, and a calculator for calculating a positional deviation in the sub-scanning direction between images based on the conversion value obtained by the converter, wherein the conversion value is updated based on a result of the calculation by the calculator.

According to the above aspect, the resolution of the sub-scanning position detection sensor is higher than the writing resolution. Therefore, the position information of the scanning laser beam can be obtained in detail. Based on this information, it is possible to minimize the deviation in the lead registration in the case of the control in the same one scan unit. In other words, when the scanning laser beam is based on a scan line, it is possible to determine an accurate position, and carry out a proper control based on this position. As a result, according to the above aspect, the converter carries out a conversion so as to be able to compare the detection value of each color obtained by the sub-scanning position detection sensor in a value smaller than a scan line unit, thus enabling characteristic extraction. Due to the computer comparing the conversion values of the respective colors with each other and computing the sub-scanning direction positional deviations between the respective images and updating the conversion values on the basis of the results of computation, it is possible to minimize a deviation in the lead registration in the control based on the scan line unit.

As explained above, according to the above aspects of the present invention, there is a superior effect in that it is possible to carry out the setting and control of the write start position in the sub-scanning direction and to prevent a color deviation, at low cost in a simple structure.

BRIEF DESCRIPTION OF THE DRAWINGS

FIG. 5 is a schematic plan view showing how each sensor is disposed on a sensor substrate.

FIG. 7A and FIG. 7B are schematic structural diagrams showing other examples of a sub-scanning position detection sensor.

DETAILED DESCRIPTION OF THE PREFERRED EMBODIMENTS

Figure 1:
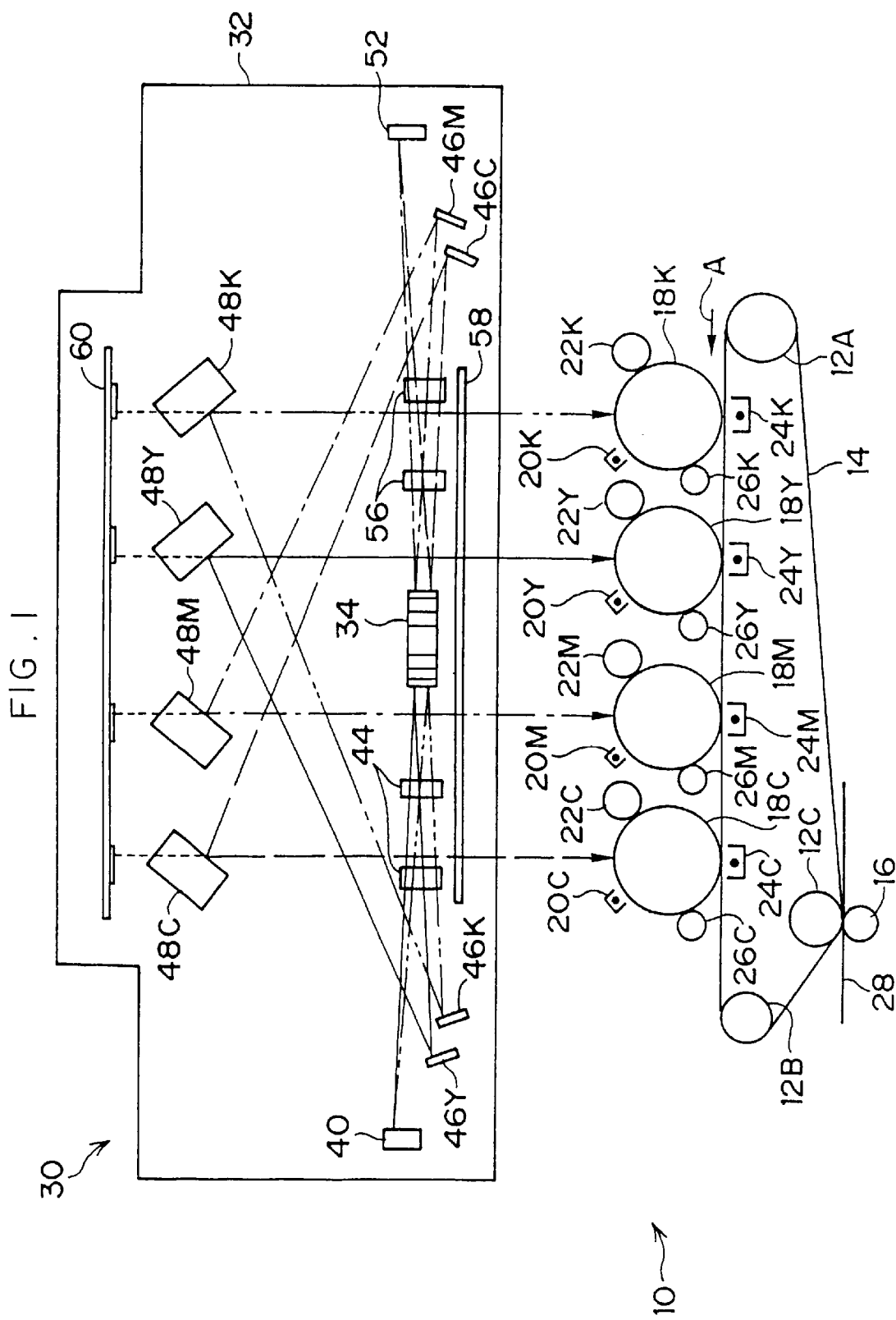
FIG. 1 is a schematic structural diagram of a color-image forming apparatus and a multiple beam scanning apparatus relating to an embodiment of the present invention.

One embodiment of the present invention will be explained in detail below with reference to the drawings. FIG. 1 shows what is called a spray paint system color-image forming apparatus 10 as a color-image forming apparatus relating to the present invention. The color-image forming apparatus 10 consists of three carrier rollers 12A to 12C, a transfer belt 14 having no edge wound around the carrier rollers 12A to 12C, and a transfer roller 16 disposed opposite to the carrier roller 12C by sandwiching the transfer belt 14.

On the transfer belt 14, a photosensitive material drum 18K for forming a black (K) image, a photosensitive material drum 18Y for forming a yellow (Y) image, a photosensitive material drum 18M for forming a magenta (M) image, and a photosensitive material drum 18C for forming a cyan (C) image, are disposed with approximately equal intervals between them along a movement direction (a direction of an arrow A in FIG. 1) of the transfer belt 14 when the transfer belt 14 is driven to rotate. These photosensitive material drums 18 are disposed such that their axial lines are orthogonal to the movement direction of the transfer belt 14 respectively.

In the subsequent description, portions for the colors K, Y, M and C are assigned the symbols K, Y, M and C to reference numbers of those portions to discriminate between these colors.

In the vicinity of each photosensitive material drum 18, a charger 20 for charging this photosensitive material drum 18 is disposed. Above the photosensitive material drums 18, there is disposed a multiple beam scanning apparatus 30, to be described later, for forming electrostatic latent images on the respective photosensitive material drums 18 by irradiating laser beams onto the charged photosensitive material drums 18.

Further, in the vicinity of the respective photosensitive material drums 18 and at the downstream side of the laser beam irradiation positions in the rotation direction of the photosensitive material drums 18, there are disposed developers 22 for developing electrostatic latent images formed on the photosensitive material drums 18 by toners of respective predetermined colors K, Y, M and C to form toner images, transfer units 24 for transferring the toner images formed on the photosensitive material drums 18 onto the transfer belt 14, and cleaners 26 for removing toners remaining on the photosensitive material drums 18, respectively.

The toner images having colors which are different from each other formed on the photosensitive material drums 18 are transferred onto the transfer belt 14 so as to be superimposed onto each other on the surface of the transfer belt 14. Thus, the color toner image is formed on the transfer belt 14. This color toner image is transferred onto a transfer material 28 sent between the carrier roller 12C and the transfer roller 16. Then, this transfer material 28 is sent to a fixing unit not shown, and this fixing unit fixes the transferred image. The full color image is formed on the transfer material 28 in this way.

Figure 2:
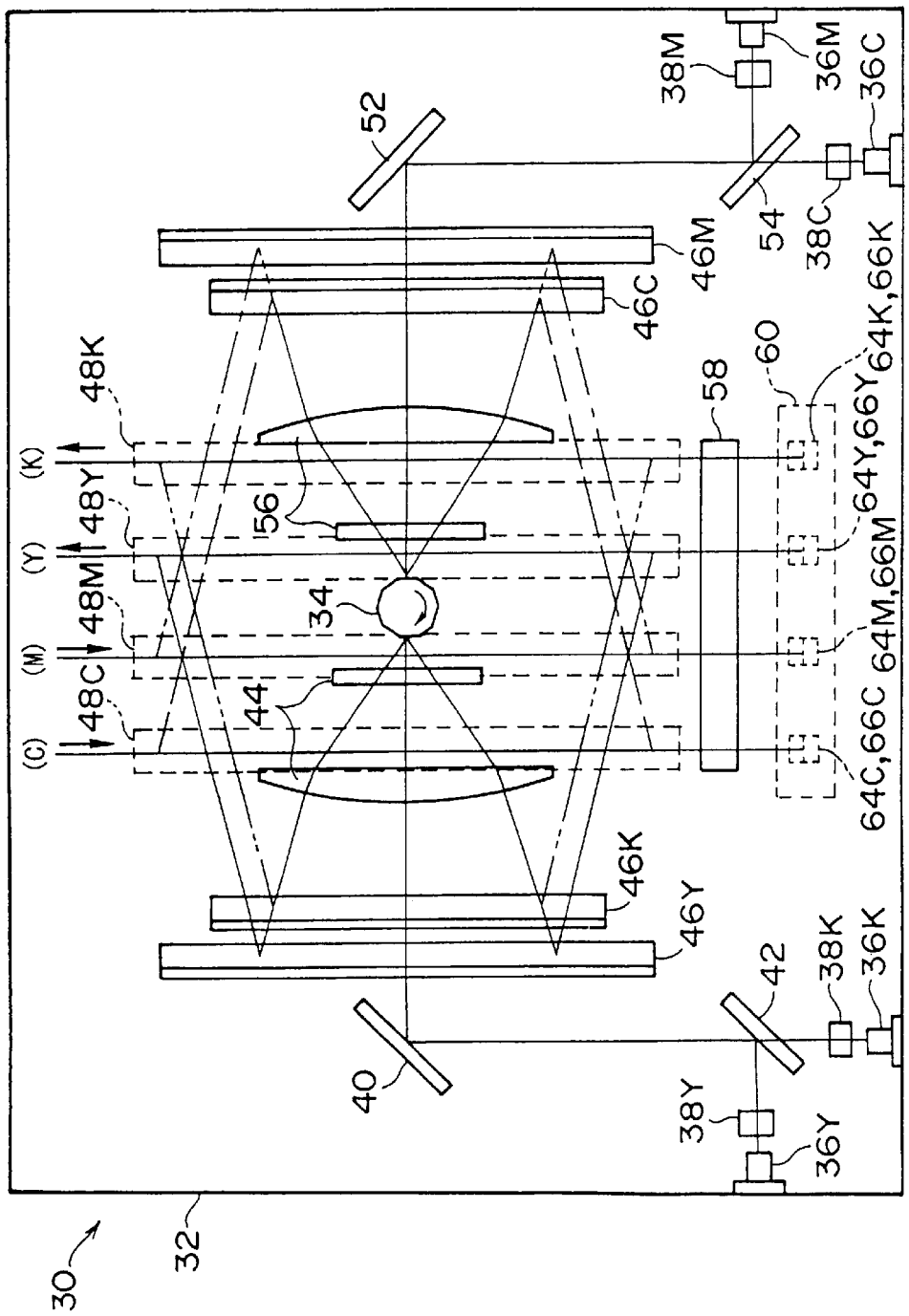
FIG. 2 is a schematic plan view of the multiple beam scanning apparatus.

The multiple beam scanning apparatus 30 will be described next with reference to FIG. 1 and FIG. 2. The multiple beam scanning apparatus 30 has a casing 32 (refer to FIG. 3 as well) having a bottom with a substantially rectangular shape. At approximately the center of the casing 32, there is disposed a rotating polygonal mirror that is rotated at high speed by a motor not shown. At one end of the casing 32 along a direction orthogonal to the axis of the rotating polygonal mirror 34, there are disposed near the corner, a semiconductor laser for emitting a laser beam (hereinafter to be referred to as an LD) 36K that irradiates a laser beam onto the photosensitive material drum 18K, and an LD 36Y that irradiates a laser beam onto the photosensitive material drum 18Y respectively.

At the laser beam emission side of the LD 36K, a collimator lens 38K and a plane surface mirror 40 are disposed in this order. A laser beam K emitted from the LD 36K is changed into a parallel luminous flux by the collimator lens 38K, and this luminous flux is incident on the plane surface mirror 40. At the laser beam emission side of the LD 36Y, a collimator lens 38Y and a plane surface mirror 42 are disposed in this order. A laser beam Y emitted from the LD 36Y is changed into a parallel luminous flux by the collimator lens 38Y. This luminous flux is reflected by the plane mirror 42 and is then made incident on the plane surface mirror 40.

An fθ lens 44 is disposed between the plane surface mirror 40 and the rotating polygonal mirror 34. A laser beam K and a laser beam Y reflected by the plane surface mirror 40 are transmitted through the fθ lens 44, and are made incident on the rotating polygonal mirror 34. The laser beam K and laser beam Y are then reflected and deflected by the rotating polygonal mirror 34, and are transmitted through the fθ lens 44 again. Thus, this has what is called a double-path structure (refer to FIG. 1).

The LD 36K and the LD 36Y have different positions along the axial direction (corresponding to the sub-scanning direction) of the rotating polygonal mirror 34. The laser beam K and the laser beam Y are incident to the rotating polygonal mirror 34 at different angles of incidence along the sub-scanning direction. Therefore, the laser beams K and Y that have passed through the fθ lens 44 two times are incident on separate plane surface mirrors 46K and 46Y respectively.

The laser beam K is then reflected by the plane surface mirror 46K, and is incident on a cylindrical mirror 48K disposed at a position above the photosensitive material drum 18K. The laser beam K is then emitted from the cylindrical mirror 48K to the photosensitive material drum 18K to scan around the periphery of the photosensitive material drum 18K. The laser beam Y is then reflected by the plane surface mirror 46Y, and is incident to a cylindrical mirror 48Y disposed at a position above the photosensitive material drum 18Y. The laser beam Y is then emitted from the cylindrical mirror 48Y to the photosensitive material drum 18Y to scan around the periphery of the photosensitive material drum 18Y.

Figure 3:
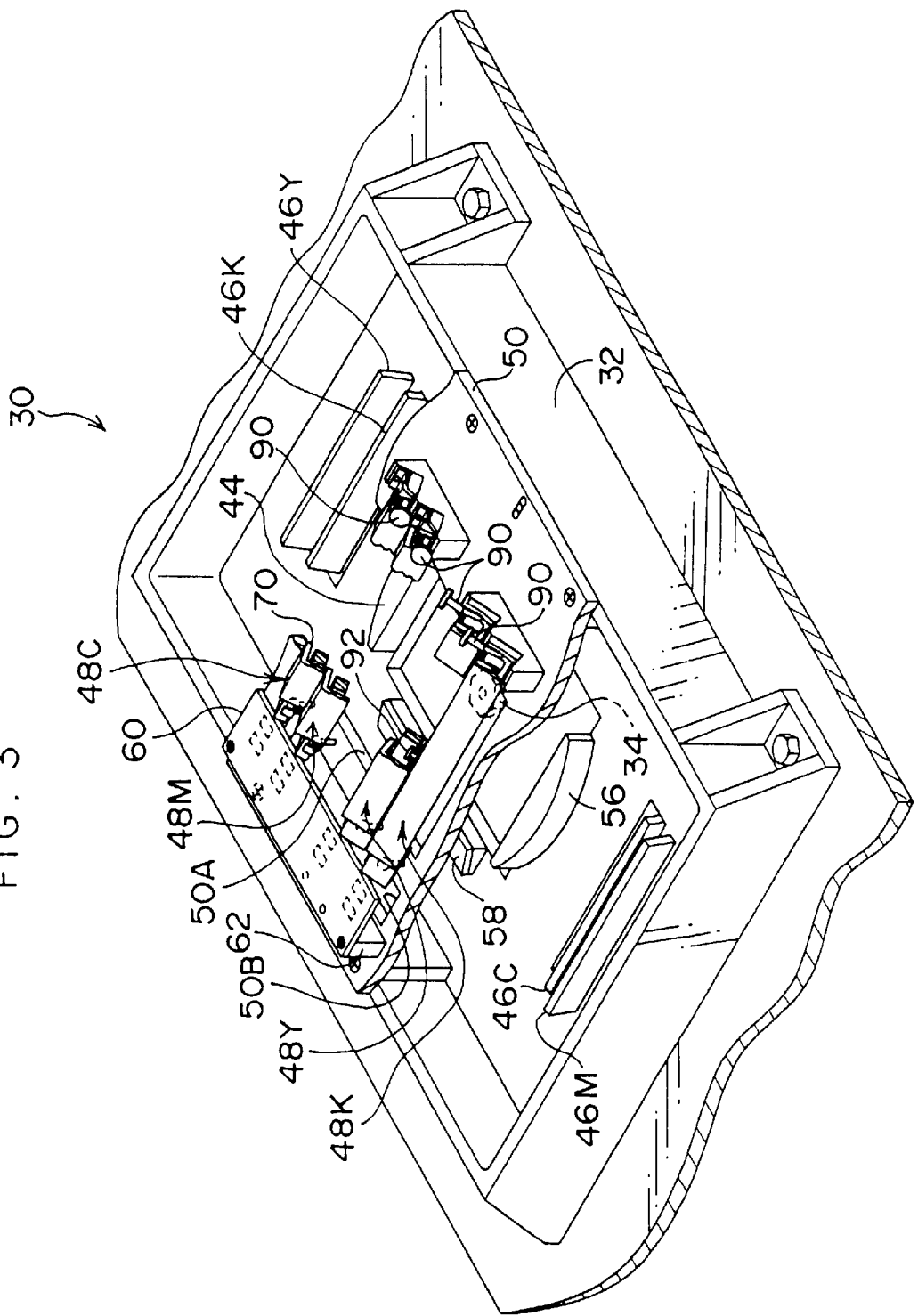
FIG. 3 is a perspective view of the multiple beam scanning apparatus with a lid of a casing partly broken.

As shown in FIG. 3, the upper portion of the casing 32 is totally shielded by a lid 50. At approximately the center of the lid 50, a rectangular opening 50A is provided for laser beams to pass through. The cylindrical mirrors 48K and 48Y are disposed on the upper surface of the lid 50 to straddle the opening 50A.

On the other hand, inside the casing 32, at an end portion opposite to the positions of the LD 36K and LD 36Y that sandwich the rotating polygonal mirror 34, there are disposed near the corner an LD 36M for emitting a laser beam that irradiates the photosensitive material drum 18M, and an LD 36C for emitting a laser beam that irradiates the photosensitive material drum 18C respectively.

At the laser beam emission side of the LD 36C, a collimator lens 38C and a plane surface mirror 52 are disposed in this order. A laser beam C emitted from the LD 36X is changed into a parallel luminous flux by the collimator lens 38C, and this luminous flux is made incident on the plane surface mirror 52. At the laser beam emission side of the LD 36M, a collimator lens 38M and a plane surface mirror 54 are disposed in this order. A laser beam M emitted from the LD 36M is changed into a parallel luminous flux by the collimator lens 38M. This luminous flux is reflected by the plane mirror 54 and is then made incident on the plane surface mirror 52.

An fθ lens 56 is disposed between the plane surface mirror 52 and the rotating polygonal mirror 34. A laser beam C and a laser beam M reflected by the plane surface mirror 52 are transmitted through the fθ lens 56, and are made incident on the rotating polygonal mirror 34. The laser beam C and laser beam M are then reflected and deflected by the rotating polygonal mirror 34, and are transmitted through the fθ lens 56 again.

The LD 36C and the LD 36M have different positions along the axial direction (corresponding to the sub-scanning direction) of the rotating polygonal mirror 34. The laser beam C and the laser beam M are incident on the rotating polygonal mirror 34 at different angles of incidence in the sub-scanning direction. Therefore, the laser beams C and M that have passed through the fθ lens 56 two times are incident on separate plane surface mirrors 46C and 46M respectively.

The laser beam C is then reflected by the plane surface mirror 46C, and is incident on a cylindrical mirror 48C disposed at a position above the photosensitive material drum 18C. The laser beam C is then emitted from the cylindrical mirror 48C to the photosensitive material drum 18C to scan the periphery of the photosensitive material drum 18C. The laser beam M is then reflected by the plane surface mirror 46M, and is made incident on a cylindrical mirror 48M disposed at a position above the photosensitive material drum 18M. The laser beam M is then emitted from the cylindrical mirror 48M to the photosensitive material drum 18M to scan the periphery of the photosensitive material drum 18M.

As is clear from the above description, the laser beams K and Y and the laser beams C and M are incident on opposing surfaces of the rotating polygonal mirror 34. Therefore, as shown by arrows in FIG. 2, the laser beams K and Y and the laser beams C and M are scanned in directions opposite to each other. The cylindrical mirrors 48C and 48M are also disposed on the upper surface of the lid 50 to straddle the opening 50A of the casing 32 as shown in FIG. 3.

Near the bottom of the casing 32, a pickup mirror (a plane surface mirror) 58 is disposed across scan tracks of the laser beams K, Y, M and C that are reflected by the cylindrical mirrors 48K, 48Y, 48M and 48C respectively. Of the laser beam tracks, the pickup mirror 58 is disposed near the start of scanning (SOS) of the laser beams K and Y, that is, near the end of scanning(EOS) of the laser beams M and C.

As shown in FIG. 3, on the lid 50 of the casing 32, there is formed an opening 50B through which is passed each laser beam that has been made incident on the pickup mirror 58 and reflected by this mirror. A sensor substrate 60 is disposed at a position where a laser beam which has been passed through the opening 50B can be received. The sensor substrate 60 is installed on the upper surface of the lid 50 via a bracket 62.

Figure 4:
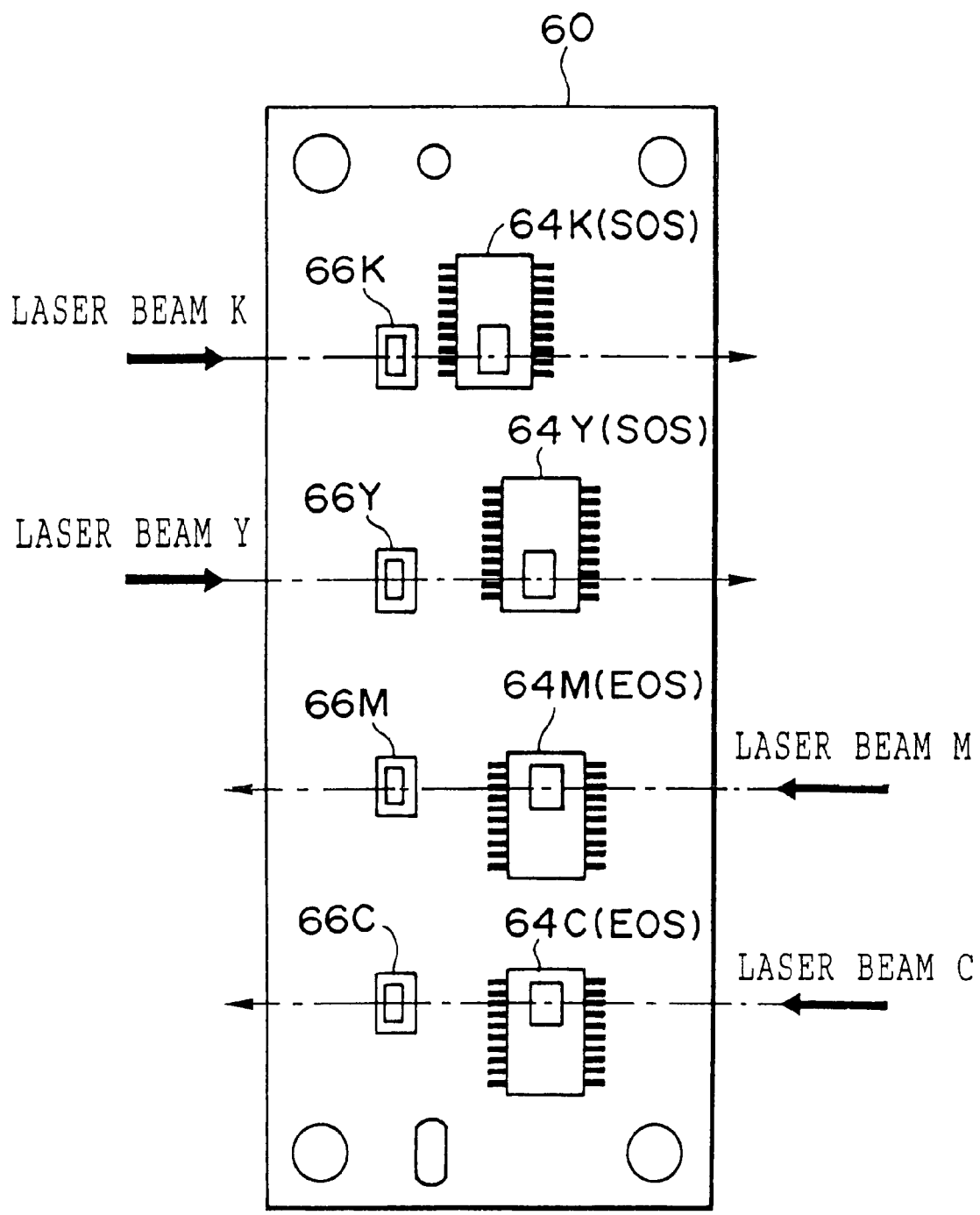
FIG. 4 is a schematic plan view showing how each sensor is disposed on a sensor substrate.

The laser beams K, Y, M and C scan across the sensor substrate 60 as indicated by one-dot chain lines in FIG. 4. On the sensor substrate 60, main-scanning position detection sensors 64 and sub-scanning position detection sensors 66 are disposed in an array along the scanning tracks of laser beams.

Each main-scanning position detection sensor 64 is an optical sensor that outputs signals at different output levels when a laser beam is passing through a light receiving section (a rectangular portion in FIG. 4) formed on a sensor chip and when the laser beam is not passing through the light receiving section.

In other words, as shown in FIG. 5, the main-scanning position detection sensors 64K and 64Y detect laser beams of the color K and the color Y respectively near the start of scanning (SOS). Therefore, it is possible to detect the scan start timing of the color K and the color Y respectively at each one scanning (main scanning). The main-scanning position detection sensors 64M and 64C detect laser beams of the color M and the color C respectively near the end of scanning (EOS). Therefore, it is possible to detect the scan end timing of the color M and the color C respectively at each scanning (main scanning).

It may also be arranged such that all the main-scanning position detection sensors 64 detect the laser beams at the start of scanning.

In the following description, a detection signal that is output from the main-scanning position detection sensor 64K corresponding to the laser beam of the color K is expressed as "SOS (K)", and a detection signal that is output from the main-scanning position detection sensor 64Y corresponding to the laser beam of the color Y is expressed as "SOS (Y)". A detection signal that is output from the main-scanning position detection sensor 64M corresponding to the laser beam of the color M is expressed as "SOS (M)", and a detection signal that is output from the main-scanning position detection sensor 64C corresponding to the laser beam of the color C is expressed as "SOS (C)".

The main-scanning position detection sensors 64 are disposed as shown in FIG. 4, where only the main-scanning position detection sensor 64K is disposed at a position slightly upstream of the scanning direction of the laser beam of the color K with respect to where the main-scanning position detection sensors of other color 64Y, 64M and 64C are disposed.

This means that only the main-scanning position detection sensor 64 of the reference laser beam is disposed at a position different from the positions of the main-scanning position detection sensors 64 of other laser beams. When the main-scanning position detection sensor of color other than K becomes a reference, only the main-scanning position detection sensor 64 of this reference color is disposed so as to be shifted. Further, as the beam scanning apparatus of the spray paint system according to the present invention has a symmetrical structure, the two scanning laser beams at each side have similar characteristics. Therefore, it is possible to decrease the number of the main-scanning position detection sensors for outputting the detection signals SOS and the main-scanning position detection sensors for outputting the detection signals EOS, respectively to one.

While the sensors corresponding to the respective colors of K, Y, M and C are formed integrally on the sensor substrate 60 and these colors are picked up by one pickup mirror 58, it is also possible to provide the pickup mirror and the sensor substrate for each color.

Each main-scanning position detection sensor 64 is connected to a control substrate 71 for controlling the operation of the multiple beam scanning apparatus 30 as shown in FIG. 5. The detection signals SOS (K), SOS (Y), EOS (M) and EOS (C) detected by the main-scanning position detection sensors 64 are transmitted to the control substrate 71.

Each sub-scanning position detection sensor 66 detects a position where a laser beam is passed in the sub-scanning direction (a longitudinal direction of the sensor substrate 60 in FIG. 4) that is orthogonal to the scanning direction of the laser beam. The sub-scanning position detection sensor 66 then outputs a signal at a level corresponding to the detected passing position. In the following description, a detection signal output from the sub-scanning position detection sensor 66K corresponding to the laser beam K will be indicated by "PSD (K)", and a detection signal output from the sub-scanning position detection sensor 66Y corresponding to the laser beam Y will be indicated by "PSD (Y)". Further, a detection signal output from the sub-scanning position detection sensor 66M corresponding to the laser beam M will be indicated by "PSD (M)", and a detection signal output from the sub-scanning position detection sensor 66C corresponding to the laser beam C will be indicated by "PSD (C)".

Each sub-scanning position detection sensor 66 is used for correcting a deviation of a color registration in the sub-scanning direction that is incurred by a variation in the position of the laser beam in the sub-scanning direction. Therefore, in principle, the sub-scanning position detection sensor 66 may be disposed at any position at which it is possible to detect a position of the laser beam in the sub-scanning direction. The sub-scanning position detection sensor 66 may be disposed on the photosensitive member (not shown) onto which an image is actually written, or may be disposed at a position which is the same as that of the photosensitive member.

This will be explained by taking a simplified beam scanning apparatus shown in FIG. 6 as an example. In a beam scanning apparatus 30' shown in FIG. 6, a laser beam incident on the sub-scanning position detection sensor 66 is reflected once by a reflection mirror 46. An optical path is disposed such that a length of each element has a position equivalent to that of the photosensitive member 18. In this case, it is also possible to dispose the sub-scanning position detection sensor 66 in the beam scanning apparatus 30'. When the sub-scanning position detection sensor 66 is disposed in the beam scanning apparatus 30', it is possible to make the design of the color-image forming apparatus itself compact.

Figure 6:
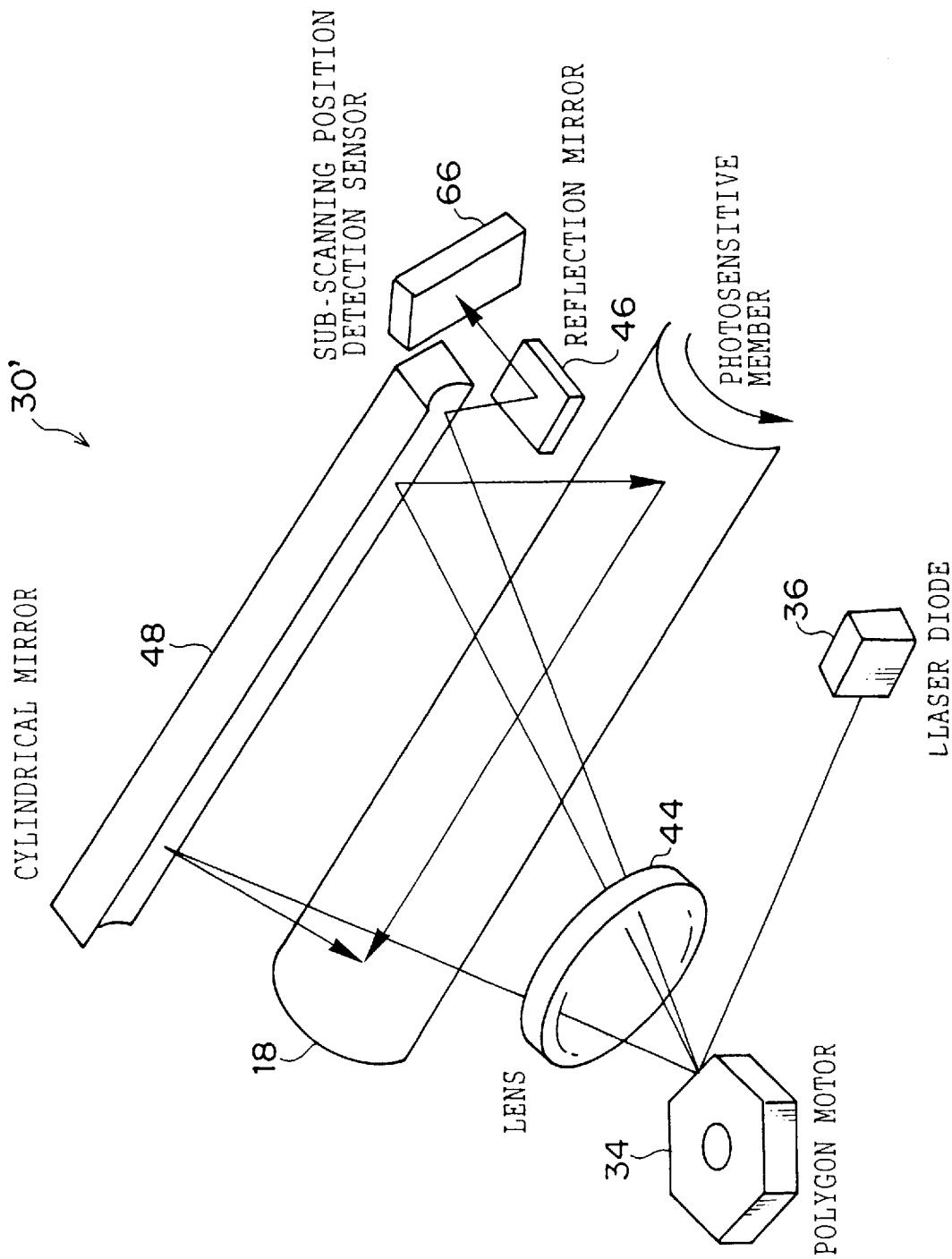
FIG. 6 is a schematic structural diagram of a simplified beam scanning apparatus.

The sensor substrate 60 shown in FIG. 5 and FIG. 6 has a structure that the elements of which it is composed, which are shown in FIG. 6, are mounted on the beam scanning apparatus 30 of the spray paint system. Although the sub-scanning position detection sensors 66 are disposed on one substrate in FIG. 4 and FIG. 5 respectively, each sub-scanning position detection sensor 66 may be disposed individually. Further, although the sub-scanning position detection sensors 66 are disposed at the outside of the image formation section in this layout, the layout is not particularly limited thereto. The sub-scanning position detection sensors 66 may be disposed at any position on the beam scanning apparatus 30 which the layout permits. It is best that the sub-scanning position detection sensors 66 are disposed at a position equivalent to that of the photosensitive member 18 with respect to a semiconductor laser. As a result, a positional variation of the laser beam on the photosensitive member 18 in the sub-scanning direction becomes a positional variation on the sub-scanning position detection sensor 66, and this is directly reflected as an output of the sensor. When the position at which the position detection sensor 66 is disposed is not at a position equivalent to that of the photosensitive member, a correction becomes necessary. For this purpose, an additional circuit may become necessary. While the sensor used in FIG. 4 and FIG. 5 shows a position sensor (PSD) as an example, the sensor is not limited thereto. It is also possible to use a line sensor CCD 67 that is capable of detecting a scanning laser beam position in the sub-scanning direction as shown in FIG. 7A, or a slit system sensor 68 as shown in FIG. 7B.

Figure 8:
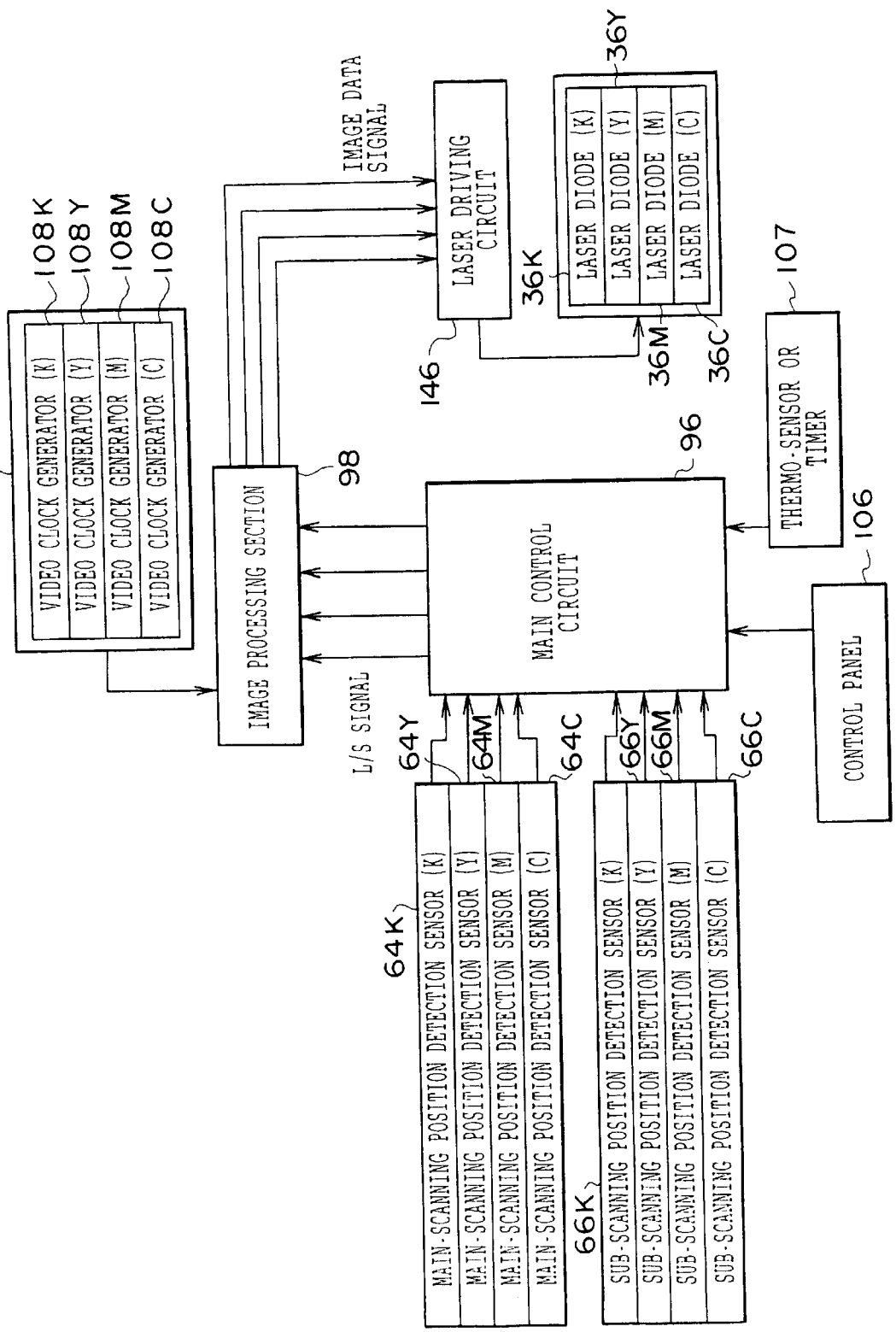
FIG. 8 is a block diagram of a control system of a color-image forming apparatus.

Next, a structure of the control system for controlling the operation of the multiple beam scanning apparatus 30 including a circuit for controlling the drive of the LD 36K, 36Y, 36M and 36C will be described with reference to FIG. 8. The main-scanning position detection sensors 64 and the sub-scanning position detection sensors 66 are connected to a main control circuit 96 respectively. An image processing section 98 is connected to the main control circuit 96.

The main control circuit 96 is also connected with a control panel 106 that is structured to include a display unit like a liquid crystal display and information input units like a ken-key and a touch-panel, and a thermo-sensor or a timer 107.

A video clock-generating unit 108 is connected to the image processing section 98. The video clock generating unit 108 is provided with video clock generators 108K, 108Y, 108M and 108C for generating video clock signals of the respective colors that prescribe modulation timings of each one dot for laser beams.

The video clock signal is a signal for prescribing a timing of modulation at each dot. Therefore, when the frequency of a video clock signal changes, a dot interval in the main scanning direction changes, and also a scale factor (a record range length in the main scanning direction of the laser beam) changes.

The main control circuit 96 generates line synchronization signals L/S for the four colors K, Y, M and C that represent timings for starting a modulation of each laser beam at one-time scanning for four laser beams emitted from the respective LD's 36, based on the detection signals SOS and the line synchronization set data held inside the circuit. The main control circuit 96 then outputs the line synchronization signals to the image processing section 98.

The image processing section 98 is connected with an LD driving circuit 146. Color image data to be formed on the transfer material 28 is broken down into the four colors K, Y, M and C as color image data. This color image data is input to the image processing section 98.

The LD driving circuit 146 controls the drive of the LD's 36K, 36Y, 36M and 36C so that they respectively emit laser beams modulated according to the image data corresponding to the same colors at timing synchronous with video clock signals CLK corresponding to the same colors within a period prescribed by synchronization signals SYN corresponding to the same colors respectively. Thus, the LD's 36 emit laser beams. The emitted laser beams are deflected along the rotation of the rotating polygonal mirror 34, to thereby scan the photosensitive material drums 18K, 18Y, 18M and 18C respectively.

Figure 9:
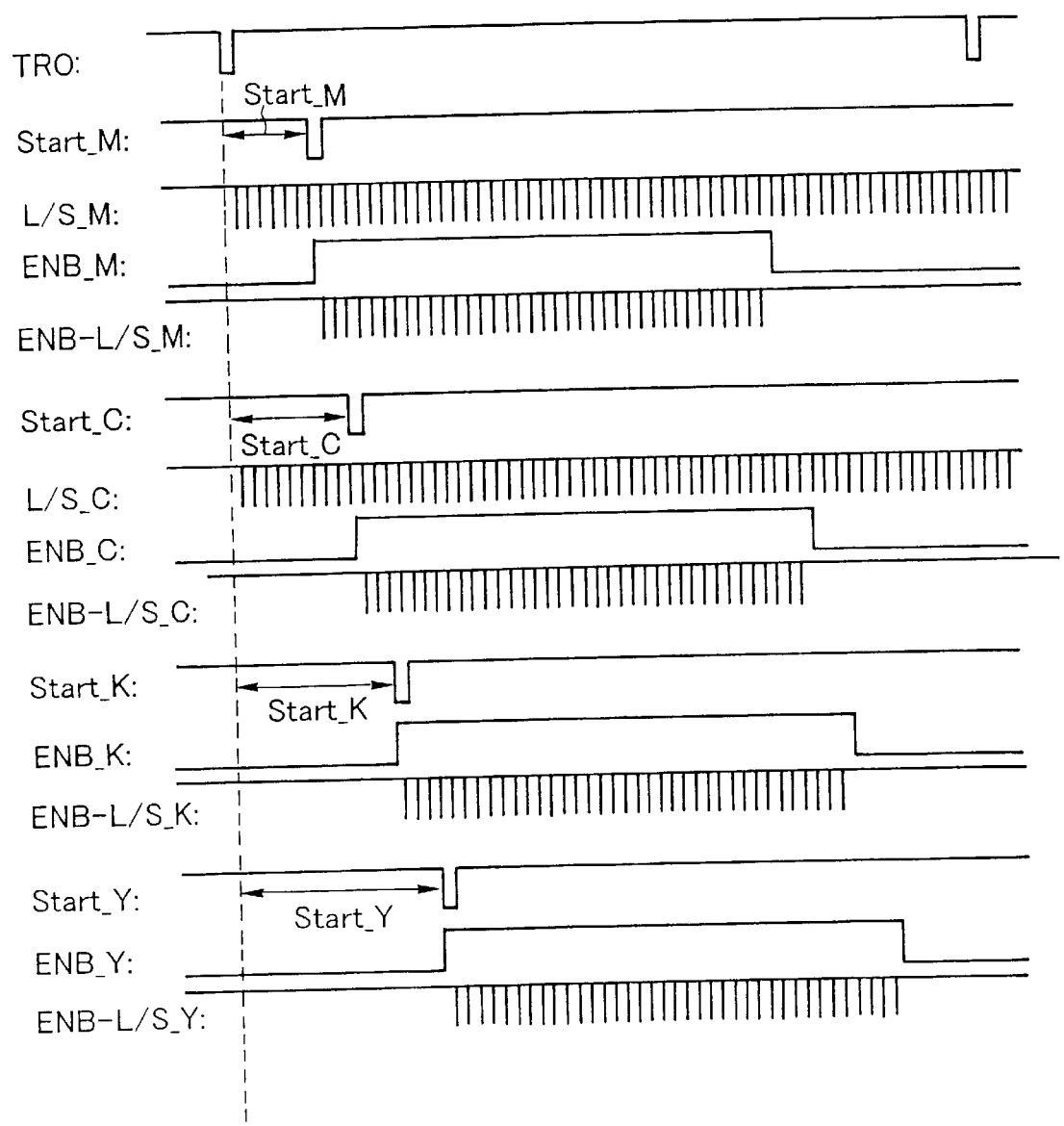
FIG. 9 is a timing chart showing a write start timing of each color.

The registration in the sub-scanning direction will be described next. The registration in the sub-scanning direction is determined based on a count value of the scanning line from a reference position. FIG. 9 shows a timing chart in the color-image forming apparatus. As shown in FIG. 9, the color-image forming apparatus carries out the exposure starting from the exposure for magenta, then the exposure for cyan, the exposure for black, and lastly the exposure for yellow. The write start position is determined based on the level of counting of the line synchronization signal L/S of each scanning line since a trigger signal TRO showing a predetermined reference has been output. A reference position of the transfer belt or a front end of a recording paper that becomes a trigger at the time of forming a color image can become the reference. A count value from the reference is Start-M in the case of magenta. Thereafter, a synchronization signal, that is, an ENB_M signal shown in FIG. 9, makes valid the line synchronization signal between high levels (a line synchronization signal ENB-L/S_M shown in FIG. 9). When image data is loaded, an image of magenta is actually formed, When the value of the Start-M is changed, it is possible to change the position in the sub-scanning direction of the image of magenta that is recorded. Similarly, count values Start-C, Start-K and Start-Y are determined for cyan, black and yellow respectively from the reference for a sequential recording. When the values of these count values are changed, it is possible to change the positions in the sub-scanning direction. Therefore, it is possible to obtain a color image having no color deviation by setting the values of Start-M, Start-C, Start-K and Start-Y for obtaining desired values of color registration.

Depending on a change in temperatures within the color-image forming apparatus, the position of the scanning laser beam in the sub-scanning direction may change slightly, even when the color registration has been set once. As a result, when the color set values of Start-M, Start-C, Start-K and Start-Y are left at the initially set values, the color registration deviates and there is a change in the positions of the scanning laser beams in the sub-scanning direction. As a result, an image of different colors is formed. In order to correct this color deviation, the output of the sub-scanning position detection sensor 66 is utilized. A control method for this will be explained next.

Figure 10:
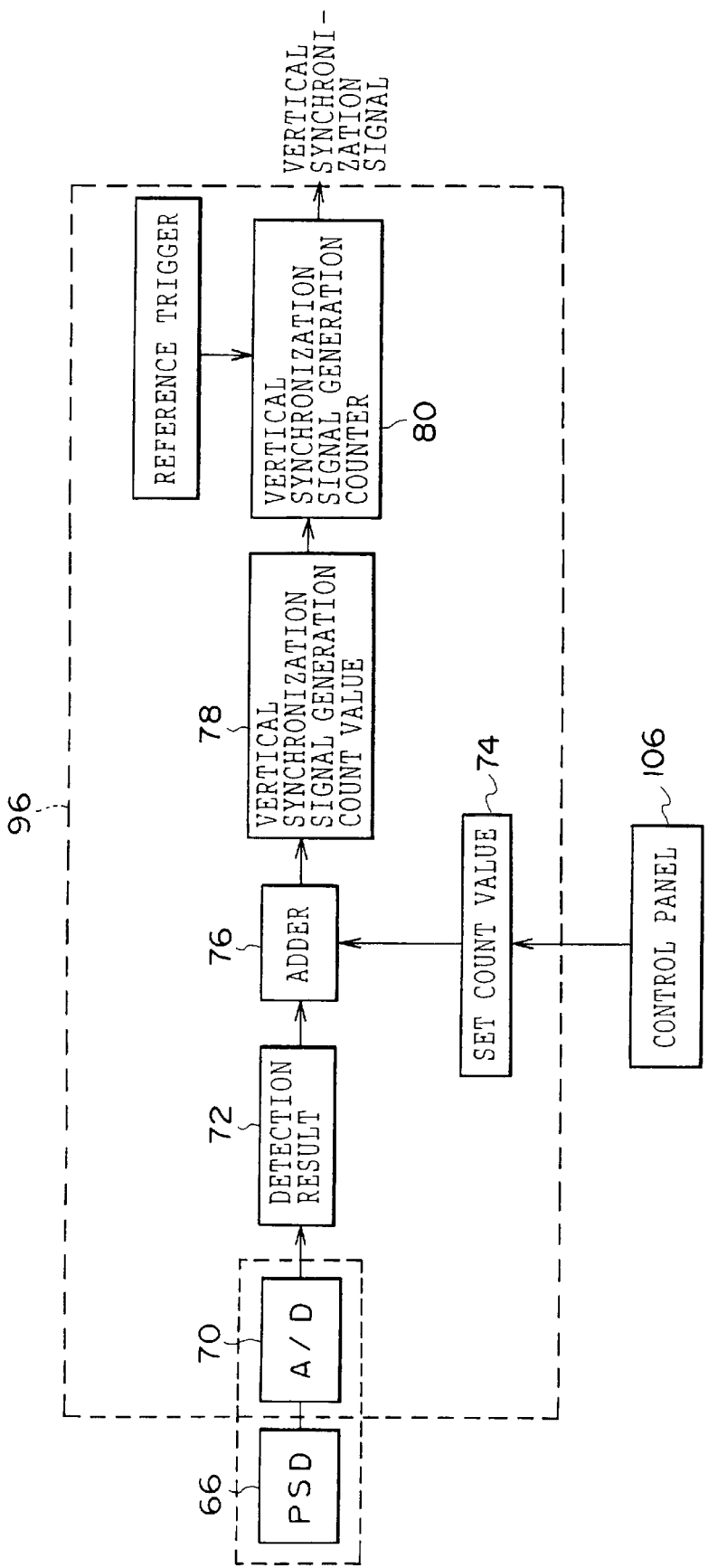
FIG. 10 is a schematic block diagram of a circuit for controlling a write start timing of a sub-scanning relating to the present invention.

A registration control in the sub-scanning direction can be broadly divided into an output value of the sub-scanning position detection sensor 66, a unit for variably setting a write start position in the sub-scanning direction, that is, a count value setter for setting a count value to a vertical synchronization signal generation counter, and an adder for calculating an output value and a count value. They are included in the main control circuit 96. FIG. 10 shows a block diagram of this method. For laser beam position information, an A/D converter 70 converts an analog signal obtained from the sub-scanning position detection sensor (PSD) 66 into a digital signal. This digital output result is converted into a digital value (a detection result 72) that has the same unit system as that of the count value for generating a vertical synchronization signal. This detection result 72 and a set value (a set count value 74) as a count value for generating a vertical synchronization signal are added together by an adder 76. This added value is input to a vertical synchronization signal generation counter 80 as a count value (a vertical synchronization signal generation count value 78) for generating an actual vertical synchronization signal. The set count value 74 as an initial set value is input from a control panel 106 which serves as a setter.

Figure 11:
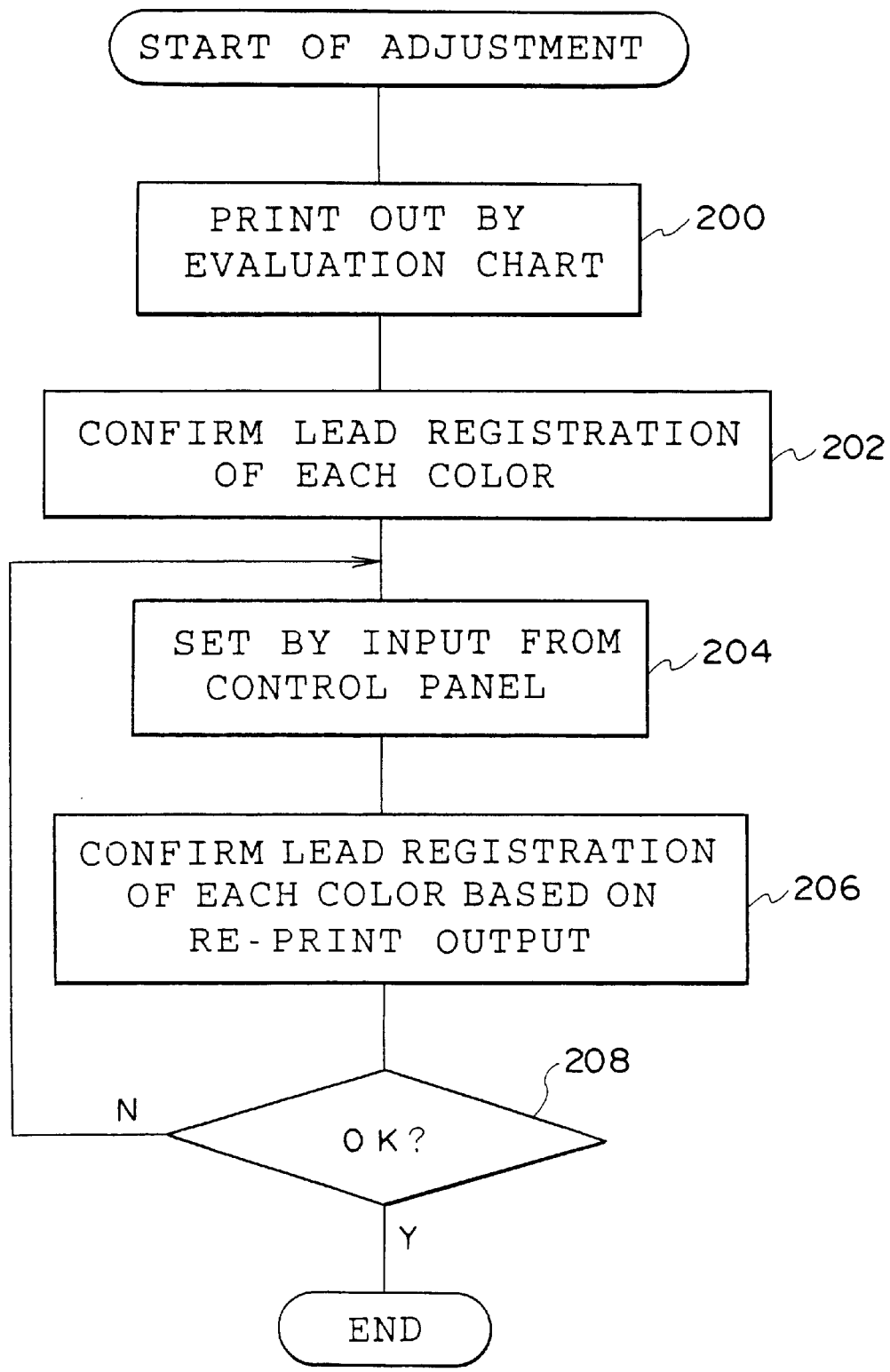
FIG. 11 is a flow chart showing a method of adjusting a color registration.

The color registration is actually adjusted according to a process in a flowchart shown in FIG. 11. First, a predetermined color registration evaluation chart is printed (step 200). Then, a lead registration position of each color is confirmed (step 202). In this case, beam positions of the laser beams of the colors in the sub-scanning direction are of course, in different places. The lead registration position is obtained by the vertical synchronization signal generation count value 78 that reflects the detection result 72 of each scanning beam and the set count value 74 in this state. This print output is observed visually or by a magnifier. By manipulating the control panel 106 of the color-image forming apparatus 10, the set count value 74 that determines each lead registration is updated so that the color registration matches (steps 204 to 208). The adjustment is carried out to obtain a desired color registration in this way. When the scanning position of a laser beam has changed after the adjustment has been carried out, this change is reflected in the detection result 72. Therefore, the vertical synchronization signal generation count value 78 increases or decreases by this change amount (in this case, the set count value 74 does not change), and this change is controlled based on feedback so that the color registration is automatically set to a constant value.

Figure 12:
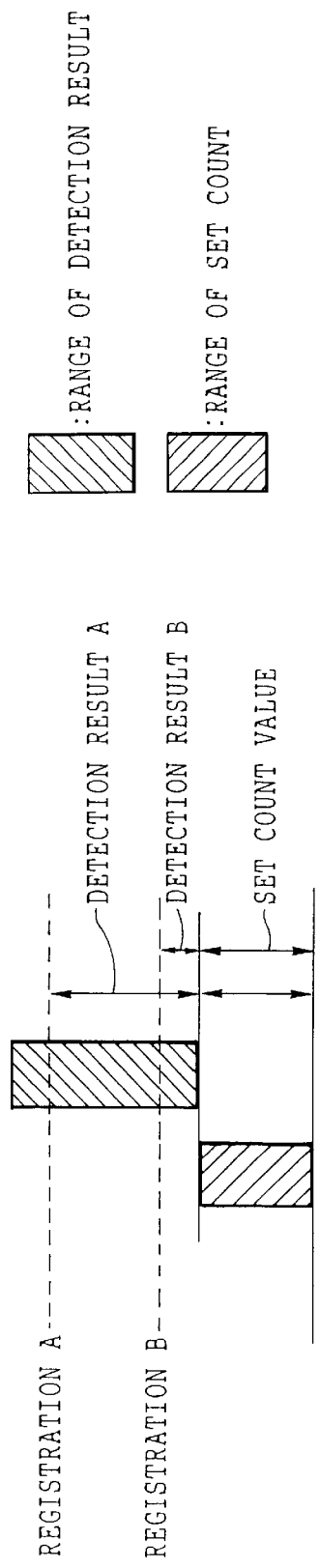
FIG. 12 is a diagram showing a relationship between a detection result of a sub-scanning position detection sensor and a set count value.

FIG. 12 shows a relationship between the detection result 72 and the set count value 74. While the adder 76 is used in the example shown in FIGS. 11 and 12, it is also possible to use a subtractor depending on the method of taking a reference. When the laser beam is at a position of a registration A, the vertical synchronization signal generation count value 78 is generated based on the set count value 74 and the detection result A. When a position of the laser beam has changed to a registration B in this state, the vertical synchronization signal generation count value 78 is generated based on the set count value 74 and the detection result B. The variation is corrected automatically. Namely, as illustrated in FIG. 12, when the detection result 72 is reduced (i.e., when the sub-scanning direction write starting is late), the vertical synchronization signal generation count value 78 is also reduced. Thus, the sub-scanning direction write start position becomes that much earlier, and this amount of change is automatically corrected such that scanning is carried out at the original position of registration A.

When a color registration is adjusted based on a print output result of the first color registration evaluation chart, only the set count value 74 is adjusted to obtain a desired color registration. A write start position in the sub-scanning direction is controlled based on the above structure. Therefore, it is not necessary to adjust the position of the scanning laser beam at the time of manufacturing the beam scanning apparatus. Further, when the beam scanning apparatus has been built into the color-image forming apparatus, it is not necessary to adjust the position of the scanning laser beam. Thus, it is not necessary to carry out a mechanical or optical adjustment at all.

Although the PSD is used as a sensing device in the above explanation with reference to FIG. 10, it is also possible to use a line CCD sensor and to construct the device using only a logic circuit by a digital processing without using an analog signal. It is also possible to construct a logic circuit in a similar manner by using a slit sensor. Therefore, it is not necessary to use the expensive A/D converter 70.

As explained above, the write start position in the sub-scanning direction is controlled for each color. The control timing will be explained next. A mechanism for varying the position of the scanning laser beam in the sub-scanning direction is as follows. First, the housing of the beam scanning apparatus is deformed by the increase in the temperature inside the image forming apparatus. Thus, there occurs a variation in the positions of the optical parts, resulting in a variation in the alignment of the laser beams. As a result, positions of the laser beams in the sub-scanning direction vary. Therefore, by monitoring the rise in the temperature, it is possible to predict a variation of the scanning beam position in the sub-scanning direction.

In the preset embodiment, the variation of the scanning beam position in the sub-scanning direction has been mainly due to the fall of the reflection mirrors 46K, 46Y, 46M and 46C of the beam scanning apparatus 30 shown in FIG. 1. Therefore, the thermo-sensor 107 (reference FIG. 8) is provided near these mirrors to be able to monitor the temperature for detecting the fall of the reflection mirrors. The position of this thermo-sensor 107 is not limited to near the reflection mirrors, but may be at a position related to the positions of the laser beams in the sub-scanning direction. It is not possible to decide the position of the thermo-sensor based on one factor. The thermo-sensor may be positioned at an optimum position by taking into account various elements such as the internal structure of the color-image forming apparatus. Next, the output of the thermo-sensor 107 is input to the main control circuit 96. The main control circuit 96 monitors the temperature to see whether the temperature has risen to a predetermined value (for example, 5° C. in the present embodiment) or not. When the temperature has exceeded the predetermined value, the control in the sub-scanning direction is started.

Instead of using the thermo-sensor 107, it is also possible to use a timer. The timer measures a time elapsed since the apparatus has been started, to thereby predict a rise in the temperature. When it has been determined that the temperature has risen after a lapse of a predetermined period of time, the control is started. In this case, the rise in the temperature is determined by taking into account both a temperature gradient during a print operation and a temperature gradient during a print waiting period. It is necessary to know a rise in the temperature of the image forming apparatus itself. However, it is possible to decrease the number of control and to obtain a satisfactory image by detailing the operation mode.

It is effective for the period in which a new update value to a vertical synchronization signal is reflected to be set as the period when the image formation is not being carried out. In other words, when the vertical synchronization signal is updated during a period while an image of each color is actually being formed, a difference in the level of the image or a color variation of the image occurs. This results is an extreme degradation of the image quality. According to the present embodiment, as the position detection sensor is provided at the outside of the image formation section, it is always possible to monitor a positional deviation of the scanning laser beams. Therefore, there is sufficient time for preparing an updated value. Thus, an optimum period for the updating is selected, and the updating is executed based on the instruction from the main control circuit 96 that controls all the functions. With this arrangement, it is possible to execute the updating at an optimum timing which does not affect the image formation. An optimum timing which does not affect the image formation means a timing when the exposure is not carried out by the scanning beams. In other words, in the timing chart shown in FIG. 9, the optimum timing is the period when each line synchronization signal is not in effect (that is, a period other than ENB-M, ENB-C, ENB-K, and ENB-Y). It is not necessary that the scanning beams of all the colors are generated at the same time. As the ENB-M, ENB-C, ENB-K, and ENB-Y signals are generated within the main control circuit 96, it is relatively easy to output the control signal updated by the same main control circuit 96. Thus, the structure for the control is also simple.

Figure 13A:
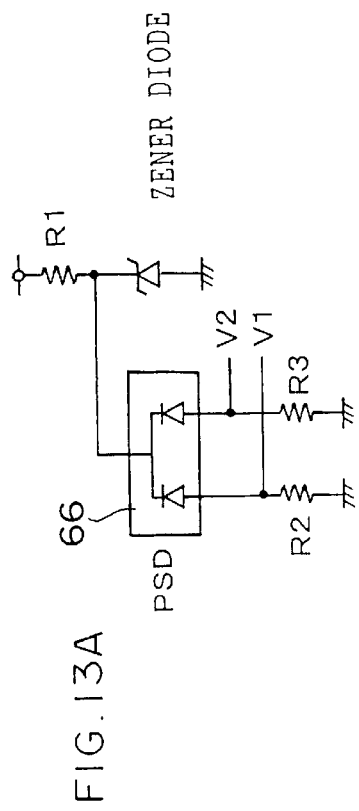
FIG. 13A and FIG. 13B are block diagrams of a circuit for calculating an output result of a sub-scanning position detection sensor.
Figure 13B:
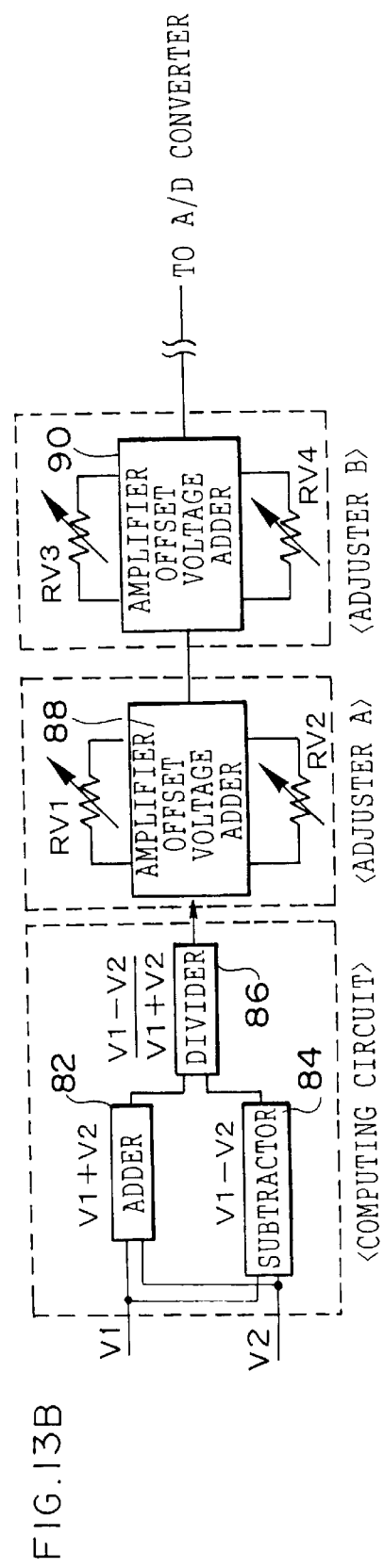

A high-precision control in the sub-scanning direction will be explained next. For carrying out a high-precision control in the sub-scanning direction, it is necessary to measure with high precision the output from the PSD as the sub-scanning position detection sensor 66 to a desired level of resolution. A detailed example of a high-precision control in the case of the PSD will be explained below. The PSD has a light-receiving surface having a size of 3.6 mm. When a laser beam has been irradiated between these surfaces, a corresponding analog signal (an analog current) is output. The analog signal is voltage converted once. Thereafter, this signal is processed by an adder and a subtractor. A result is further processed by a divider, to thereby obtain an analog signal (an analog voltage) corresponding to position information. FIG. 13A shows up to a voltage output (V1, V2) of the PSD, and FIG. 13B shows a processing of the PSD output (V1, V2).

An adder 82, a subtractor 84 and a divider 86 are analog calculating units. These may be combined in discrete, or an exclusive IC may be used. As shown in FIG. 13B, the adder 82 adds the output voltages V1 and V2 from the PSD 66, and outputs the sum to the divider 86. The subtractor 84 subtracts the voltage V2 from the voltage V1, and outputs the difference to the divider 86. The divider 86 divides the output (V1−V2) from the subtractor 84 by the output (V1+V2) from the adder 82. The output signal from the divider 86 is adjusted by an adjuster a and an adjuster b respectively, and an output from the adjuster b is input as a final position detection signal to an A/D converter 70 at the next stage.

Roles of the adjuster a and the adjuster b will be explained. The adjuster a consists of a variable resistor RV1 for adjusting an output gradient (a voltage output of the position information) of the PSD, a variable resistor RV2 for adding or subtracting an offset voltage to/from the output signal, and an amplifier/offset voltage adder 88. The adjuster a mainly absorbs a difference between units of the PSD.

Next, the adjuster b consists of a variable resistor RV3 for adjusting an amplification factor of the output voltage, a variable resistor RV4 for adding or subtracting the offset voltage, and an amplifier/offset voltage adder 90. The adjuster b is used for adjusting the setting of a range of an input to the A/D converter 70. It is necessary to carry out the above precise adjustment in order to execute a high-precision detection and to adjust a relation between the outputs from the respective sub-scanning position detection sensors 66.

For carrying out a high-precision control, it is necessary that the outputs from the sub-scanning position detection sensors 66 are linked to each other. There are two reasons for this, one reason is related to the installation of the PSD, and the other reason is related to the need of a high-precision control. For the former reason, the sub-scanning position detection sensor 66 is installed on the substrate, and a reference hole is formed on the substrate for mounting it on the exposure unit. Therefore, a positional relationship between the mechanical reference and the sub-scanning position detection sensor 66 is different depending on the state of the installation of the sub-scanning position detection sensor 66. In other word, this positional relationship is affected by the installation precision. Therefore, when the mechanical position is used as a reference, there is some deviation between the initial output of the PSD and a normal mechanical output. This deviation must be corrected for carrying out a high-precision control.

The sub-scanning position detection sensors 66 of respective colors have signals that are independent of each other in a state in which no control is carried out. Therefore, it is not possible to understand the relationship between the scanning laser beams corresponding to the respective colors. In order to keep the relationship between the scanning laser beams of different colors, it is necessary to determine a reference, and each PSD must output a signal to this reference. This explains the latter reason. In other words, it is necessary to provide a common scale. The adjuster a and the adjuster b are necessary for both the above reasons.

A high-precision control will be explained next. The output from the PSD is set from 0V to 3.6V (the light receiving surface size 3.6 mm) by the adjustment of the adjusters a and b shown in FIG. 13B. This output signal is input to the A/D converter 70, and is digitized by this converter. The A/D converter 70 is for converting 8-bit data. Therefore, the size per bit is 3.6 mm/256=14.06 μm. When the write density of the image forming apparatus is 600 dpi (one dot: 42.3 μm), it is possible to detect with the precision of ⅓ dot. The A/D conversion values are converted into values that can be easily processed later (hereinafter, this conversion will be referred to as a segment/address conversion). Table 1 shows a result of converting A/D conversion values into segment/address values.

TABLE 1

| A/D conversion value | Segment | Address |
| --- | --- | --- |
| 0 | 0 | 0 |
| 1 | 0 | 1 |
| 2 | 0 | 2 |
| 3 | 1 | 0 |
| 4 | 1 | 1 |
| 5 | 1 | 2 |
| ... | ... | ... |
| 117 | 39 | 0 |
| 118 | 39 | 1 |
| 119 | 39 | 2 |
| 120 | 40 | 0 |
| 121 | 40 | 1 |
| 122 | 40 | 2 |
| 123 | 41 | 0 |
| 124 | 41 | 1 |
| 125 | 41 | 2 |
| 126 | 42 | 0 |
| 127 | 42 | 1 |
| 128 | 42 | 2 |
| 129 | 43 | 0 |
| 130 | 43 | 1 |
| 131 | 43 | 2 |
| 132 | 44 | 0 |
| 133 | 44 | 1 |
| 134 | 44 | 2 |

TABLE 1-continued

| A/D conversion value | Segment | Address |
| --- | --- | --- |
| ... | ... | ... |
| 249 | 83 | 0 |
| 250 | 83 | 1 |
| 251 | 83 | 2 |
| 252 | 84 | 0 |
| 253 | 84 | 1 |
| 254 | 84 | 2 |
| 255 | 85 | 0 |

In this case, the segment corresponds to a scanning line, and the address is expressed as position information for the area between the scanning lines. For example, when an A/D value is 127, the segment is 42 and the address is 1. These values become the vertical synchronization signal count value 28 that is input to the vertical synchronization signal generation counter 80. For achieving a high-precision control, the address information is utilized. The segment/ address table is stored as a lookup table (hereinafter to be abbreviated as an LUT). Therefore, when an A/D value is obtained, it is possible to output the address information instantly.

The output of the PSD that expresses the output of the scanning laser beam position is linked to the output value of each color by the adjusters a and b. Therefore, the obtained A/D conversion value and the segment/address values are expressed as output values as if the four-color laser beams have scanned the same PSD. Thus, it is possible to directly compare various output values.

Therefore, when the A/D value of the color K is 126, that is, the segment is 42 and the address is 0, and when the A/D value of the color Y is 127, that is, the segment is 42 and the address is 1, for example, the difference between the laser beams is one address. In this case, this state is left as it is.

However, when the A/D value of the color Y is 128, that is, the segment is 42 and the address is 2, for example, the difference between the laser beam for Y and the laser beam for K is two addresses. Therefore, in this case, it is better to have a registration difference between the laser beams as one address and therefore the A/D value of the color Y is regarded as 125 which is the same address. Thus, by increasing or decreasing the segment by one, it is possible to obtain a minimum registration difference in the controlling a scanning line unit. The color registration can be controlled so as to be a minimum in this way. When the segments are different, control is also possible based on the same idea. In other words, control is possible based on only the address information. Table 2 shows threshold values in the example of the present embodiment.

TABLE 2

| Y/K | 0 | 1 | 2 |
| --- | --- | --- | --- |
| 0 | 0 | 1 | 2 |
| 1 | −1 | 0 | 1 |
| 2 | −2 | 1 | 0 |

From this table, a difference between the colors K and Y is obtained. Based on this value, a decision is made as to whether a segment is to be changed or not. By comparing the results obtained from the difference, it is decided whether the segment is increased or decreased.

Next, a control for the four colors will be considered. There are two kinds of control methods for this. One method may be considered an extension of the method of two colors, a scanning laser beam that becomes a reference color is determined. For example, when the color K is used as a reference color, a difference between the address of the color K and the address of other color is minimized. The relationship between the color K and the color Y is as described above. For the other colors, color M and the color C, a decision is made in a similar manner to that based on a difference between the address of the color K and the address of other color. For example, assume that the A/D value of the color K is 126, that is, the segment is 42 and the address is 0 (hereinafter a set of these values is abbreviated as 126-42-0), a similar set of values for the color Y is 128-42-2, a similar set of values for the color M is 121-40-1, and a similar set of values for the color C is 131-43-2. When the color K is a reference, it is possible to obtain an optimum color registration by decreasing the segment of the color Y to 125-41-2, keeping the color M unchanged at 121-40-1, and by decreasing the segment for the color C to 128-42-2.

In the other control method, in addition to the above method, a decision is made about an optimum value for the remaining three colors, and then a decision is made about an optimum value for the remaining two colors. In other words, based on the color K as a reference, the color Y, the color M and the color C are controlled. Next, the three colors excluding the color K are controlled. In this case, the color M and the color C are controlled using the color Y as a reference this time. Last, the color C is controlled using the color M as a reference. According to this method, a decision is made by looking at the relationships among all the colors. Therefore, the color registration is better than that obtained by the above method. However, there is not so large difference between the results obtained by these methods when the resolution at the sensor side is ⅓ dot like in the present embodiment. When this resolution is much higher and also when it is possible to measure in detail a position within the line, the latter method is more effective. So long as the former method is used, the resolution within the line is sufficient at ⅓ dot at most. It is sufficient to know if the position is above, in middle area of, or below the line. The method is to be used is decided based on the quality level of the color image and cost. When the write resolution has been improved to above 600 dpi, it is possible to obtain a sufficient color quality even by the former method.

Figure 14:
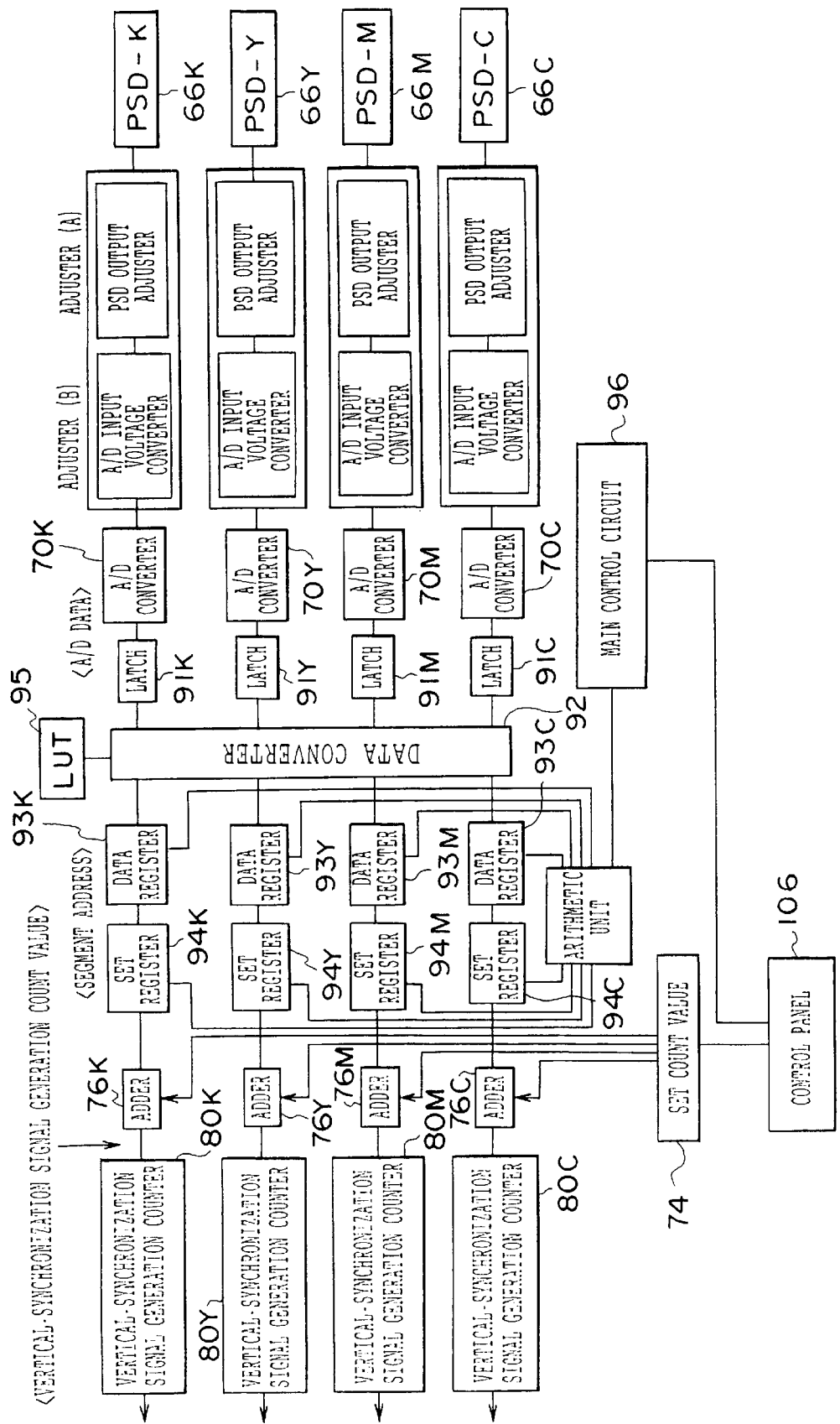
FIG. 14 is a schematic block diagram of a circuit for high-precision control of a write start timing of a sub-scanning relating to the present invention.
Figure 15:
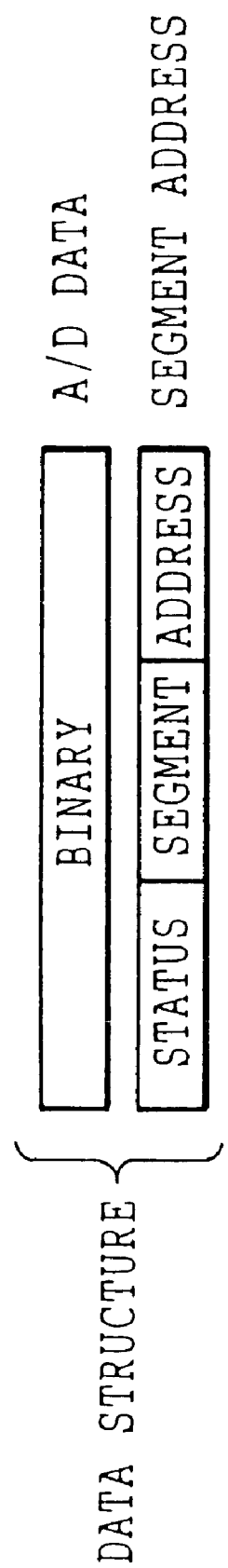
FIG. 15 is a diagram showing a data structure of A/D data.
Figure 16:
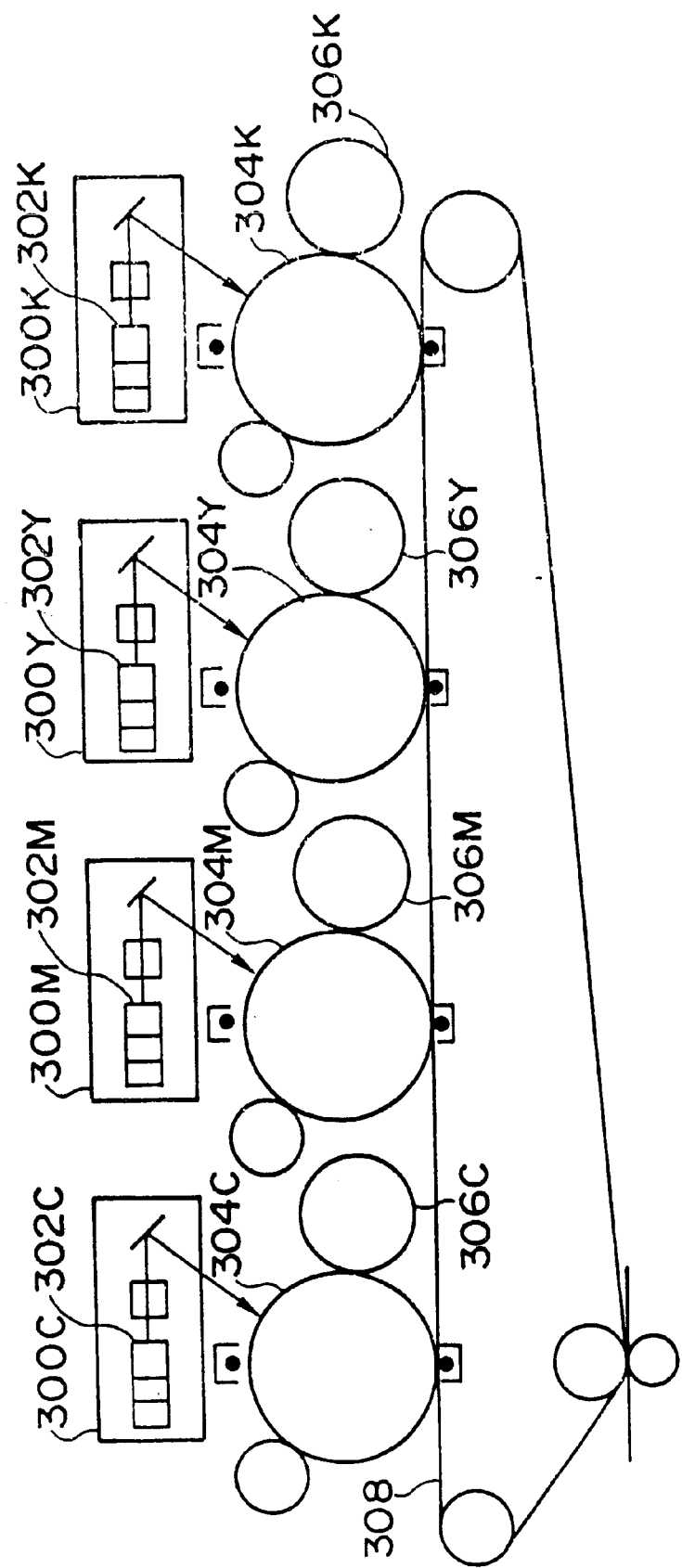
FIG. 16 is a schematic structural diagram of a conventional tandem color-image forming apparatus.

The above control is shown in a block diagram in FIG. 14. This block diagram will be explained below. The adjusters a and b adjust the output from each sub-scanning position detection sensor, and the A/D converter 70 A/D converts the adjusted value. A latch 91 latches the output of the A/D converter 70 in general. A data converter 92 converts the A/D conversion value into segment/ address values based on the information of an LUT 95, and sets these values to a data register 93. The address information in the values of the data register 93 is compared and calculated, and a segment value to be actually set is set at a set register 94. This value is set as the detection result 72 from the sensor. An adder 76 adds this value to a set count value 74 to obtain a vertical synchronization signal generation count value. This value is then input to a vertical synchronization signal generation counter 80. The control of the registration is carried out based on an enable (ENB) signal from a main control circuit 96. A data structure in the latch and a data register 93 is, as shown in FIG. 16, a structure in which a bit for holding status data is added to segment address data. This status data holds the information about whether a segment has been increased or decreased or has not been changed. This is because the information before changing the segment is necessary for controlling the registration next time.

While the PSD sensor is used as a detection device in the present embodiment, it is also possible to implement the present invention by using an other sensor. In the case of the above-described line CCD sensor, it is possible to detect the information within the line by utilizing the sensor having a pixel size of a few µm. In the case of the slit sensor system, it is possible to detect the information within the line by increasing the count clock to a multiple of a video signal.

For a high-precision control timing, the timing is controlled based on temperature information and time information according to an instruction from the main controller in a similar manner to that of the above-described control timing. Thus, it is possible to maintain a high-quality color image. Further, as it is always possible to carry out the monitoring, this can be done suitably as necessary.

What is claimed is:

1. A color-image forming apparatus comprising:
    a plurality of photosensitive members;
    a light source for emitting a plurality of optical beams;
    a scanning apparatus for forming images of each color component on the photosensitive members by scanning the plurality of optical beams on the corresponding photosensitive members;
    a setter capable of arbitrarily and variably setting write start positions in sub-scanning directions of respective colors;
    a plurality of sub-scanning position detection sensors, each for detecting a sub-scanning position of a scan optical beam of each color; and
    a calculating unit for calculating a write start position in the sub-scanning direction by adding or subtracting a set value of the setter and a detection result of each of the plurality of sub-scanning position detection sensors, wherein
        the color-image forming apparatus sequentially transfers the plurality of images formed on the plurality of photosensitive members onto a transfer unit such that the images are superimposed on the transfer unit, to thereby obtain a single image on the transfer unit.

2. The color-image forming apparatus according to claim 1, wherein
    the plurality of sub-scanning position detection sensors are provided within the scanning apparatus.

3. The color-image forming apparatus according to claim 1, wherein
    the plurality of sub-scanning position detection sensors are provided on a substrate as a unit.

4. The color-image forming apparatus according to claim 1, wherein the color-image forming apparatus further comprises a temperature detection sensor for detecting a temperature within the color-image forming apparatus, wherein
    the calculating unit calculates the write start position in the sub-scanning direction at least prior to an image formation processing, and after a predetermined time has elapsed, or when a temperature detected by the temperature detection sensor has exceeded a predetermined temperature.

5. The color-image forming apparatus according to claim 1, wherein
    in the image formation, the write start position in the sub-scanning direction is determined during a period other than a period when the image is being formed.

6. The color-image forming apparatus according to claim 1, wherein
    the plurality of sub-scanning position detection sensors have higher resolution than the image writing resolution and
    the color-image forming apparatus further comprises:
        a converter for converting a detection result of each of the plurality of sub-scanning position detection sensors into a predetermined conversion value; and
        a calculator for calculating a positional deviation in the sub-scanning direction between images based on the conversion value obtained by the converter, wherein the conversion value is updated based on a result of the calculation by the calculator.

7. The color-image forming apparatus according to claim 1, wherein
    the light source is formed of a plurality of semiconductor lasers.

8. The color-image forming apparatus according to claim 1, wherein
    the plurality of sub-scanning position detection sensors are disposed at positions equivalent to the positions of the photosensitive members with respect to the light source.

9. The color-image forming apparatus according to claim 1, wherein
    the plurality of sub-scanning position detection sensors are position sensors.

10. The color-image forming apparatus according to claim 1, wherein
    the plurality of sub-scanning position detection sensors are line CCD sensors.

11. The color-image forming apparatus according to claim 1, wherein
    the plurality of sub-scanning position detection sensors are slit system sensors.

* * * * *